US012755481B2

(12) United States Patent
Karasawa

(10) Patent No.: US 12,755,481 B2
(45) Date of Patent: Oct. 6, 2026

(54) ENHANCED IMAGE GENERATION

(71) Applicant: Sony Interactive Entertainment Inc., Tokyo (JP)

(72) Inventor: Yuki Karasawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 162 days.

(21) Appl. No.: 18/701,938

(22) PCT Filed: Nov. 19, 2021

(86) PCT No.: PCT/JP2021/042633
§ 371 (c)(1),
(2) Date: Apr. 17, 2024

(87) PCT Pub. No.: WO2023/089777
PCT Pub. Date: May 25, 2023

(65) Prior Publication Data
US 2025/0225720 A1 Jul. 10, 2025

(51) Int. Cl.
*G06T 15/50* (2011.01)
*G06T 15/06* (2011.01)
(Continued)

(52) U.S. Cl.
CPC ............ *G06T 15/506* (2013.01); *G06T 15/06* (2013.01); *G06T 17/00* (2013.01); *G06V 10/60* (2022.01)

(58) Field of Classification Search
CPC ....... G06T 15/506; G06T 15/06; G06T 17/00; G06T 15/50; G06V 10/60; G09G 3/342; G09G 320/0646; G09G 2360/16
See application file for complete search history.

(56) References Cited

U.S. PATENT DOCUMENTS 6,226,005 B1 * 5/2001 Laferriere ............. G06T 15/506 345/589
8,982,126 B1 * 3/2015 Mitev ..................... G06T 17/20 345/426
(Continued)

FOREIGN PATENT DOCUMENTS

GB 2586838 A * 3/2021 ........... H04N 13/111
JP H08-161529 A 6/1996
JP H11-3436 A 1/1999

OTHER PUBLICATIONS

Debevec; Paul, "Acquiring the Reflectance Field of a Human Face", Jul. 1, 2000, SIGGRAPH 2000 Conference Proceedings, Proceedings of the 27th annual conference on Computer graphics and interactive techniques (pp. 145-156), p. 1 (Year: 2000).*
(Continued)

*Primary Examiner* — Kee M Tung
*Assistant Examiner* — Alicia Ha
(74) *Attorney, Agent, or Firm* — Fish & Richardson P.C.

(57) ABSTRACT

An image processing apparatus arranges an object in a virtual space of a display target, and establishes a view screen corresponding to a point of view. In tracing a ray passing through a pixel included in a figure of the object, in reference to a position P and an incident direction ω of the ray incident on the object, the image processing apparatus reads a previously acquired distribution of contribution ratios of a plurality of light sources representing the sizes of effects thereof on the color of the figure of the object, the plurality of light sources being in different directions relative to the object. The image processing apparatus determines a pixel value of the pixel by calculating a weighted sum of the luminance values of light from intrascene light sources based on the contribution values obtained with respect to the directions corresponding to the intra-scene light sources.

20 Claims, 13 Drawing Sheets

(51) Int. Cl.
*G06T 17/00* (2006.01)
*G06V 10/60* (2022.01)

(56) References Cited

U.S. PATENT DOCUMENTS

| | | | | |
|---|---|---|---|---|
| 11,410,378 B1* | 8/2022 | Ghosh | G06T 7/90 | |
| 2009/0096789 A1* | 4/2009 | Peterson | G06T 15/06 | 345/426 |
| 2016/0125643 A1* | 5/2016 | Tokuyoshi | G06T 15/50 | 345/426 |
| 2018/0374260 A1* | 12/2018 | Koylazov | G06T 15/60 | |
| 2019/0114825 A1* | 4/2019 | Seibert | G06T 15/06 | |

OTHER PUBLICATIONS

Cabeleira; João, "Combining Rasterization and Ray Tracing Techniques to Approximate Global Illumination in Real-Time", 2010, Engenharia Informática e de Computadores, Universidade Técnica de Lisboa, p. 73 (Year: 2010).*

Zhan; Fangneng, "EMLight: Lighting Estimation via Spherical Distribution Approximation", May 18, 2020, AAAI, Proceedings of the AAAI Conference on Artificial Intelligence. vol. 35. No. 4., p. 3287-3292 (Year: 2020).*

Dal Corso et al., "Interactive directional subsurface scattering and transport of emergent light", The Visual Computer, 2017, available online Jan. 19, 2016, 33(3):371-383.

Extended European Search Report in European Appln. No. 21964792.2, mailed on Aug. 7, 2025, 10 pages.

Shah et al., "Image-Space Subsurface Scattering for Interactive Rendering of Deformable Translucent Objects," IEEE Computer Graphics and Applications, Jan./Feb. 2009 (Dec. 30, 2008), 29(1):66-78.

Sloan et al., "Precomputed radiance transfer for real-time rendering in dynamic, low-frequency lighting environments," ACM Transactions on Graphics (TOG), Jul. 2002, 21(3):527-536.

International Search Report and Written Opinion mailed on Dec. 28, 2021, received for PCT Application PCT/JP2021/042633, filed on Nov. 19, 2021, 09 pages including English Translation.

James T. Kajiya, "The rendering equation", ACM SIGGRAPH Computer Graphics, vol. 20, No. 4, Aug. 18-22, 1986. pp. 143-150.

Jensen et al. "A Practical Model for Subsurface Light Transport", Proceedings of the 28th annual conference on Computer graphics and interactive techniques, SIGGRAPH'2001, Aug. 12-17, 2001, pp. 511-518.

"Arnold for maya user guide/subsurface", Retrieved from Internet: https://docs.arnoldrenderer.com/display/A5AFMUG/Subsurface>, Autodesk, 2021, 3 pages.

Zedar T., "Physical Rendering with Random Walk Sub-Surface Scattering", Retrieved from Internet: https://www.linkedin.com/pulse/physical-rendering-random-walk-sub-surface-scattering-zedar-thokme/, Jan. 9, 2019, 7 pages.

* cited by examiner

| INCIDENCE PARAMETERS | LIGHT SOURCE CONTRIBUTION RATIO DISTRIBUTIONS |
|---|---|
| (Pa, ωa) | $\{w(a)_1, w(a)_2, w(a)_3, \cdots, w(a)_i, \cdots, w(a)_l\}$ |
| (Pb, ωb) | $\{w(b)_1, w(b)_2, w(b)_3, \cdots, w(b)_i, \cdots, w(b)_l\}$ |
| (Pc, ωc) | $\{w(c)_1, w(c)_2, w(c)_3, \cdots, w(c)_i, \cdots, w(c)_l\}$ |
| ··· | ··· |
| (Pm, ωm) | $\{w(m)_1, w(m)_2, w(m)_3, \cdots, w(m)_i, \cdots, w(m)_l\}$ |
| ··· | ··· |

80

ENHANCED IMAGE GENERATION

CROSS-REFERENCE TO RELATED APPLICATION

The present application is based on PCT filing PCT/JP2021/042633, filed Nov. 19, 2021, the entire contents of which are incorporated herein by reference.

TECHNICAL FIELD

The present invention relates to an image processing apparatus for generating display images, an object data generation apparatus for generating data regarding an object of a display target, an image processing method for use with the image processing apparatus, an object data generation method for use with the object data generation apparatus, and an object model data structure.

BACKGROUND ART

Advances in information processing technology and image display technology in recent years have made it possible to experience the world of video imagery in diverse forms. For example, a panoramic video displayed on a head-mounted display device presenting images reflecting the user's line of sight enhances the sense of immersion in the world of video imaginary and improves the operability of such applications as video games. Display of image data streamed from servers having abundant resources allows users to enjoy high-definition videos and game screens regardless of the location and scale of the viewing.

SUMMARY

Technical Problem

How to render and display images efficiently regardless of the purpose and format of image display is always an important issue. For example, in a mode where the point of view and the line of sight are given certain degrees of freedom to allow a three-dimensional object to be viewed from various angles, high responsiveness is needed to address display changes corresponding to a moving point of view. The same applies where the 3D (Three Dimensional) object is being moved or deformed.

Meanwhile, displaying high-quality images requires increasing resolution and performing complex calculations, which leads to an increased load on image processing. As a result, delays tend to occur in the changes of the object figure which is to originally be presented.

The present invention has been made in view of the above circumstances and provides as an object a technology for displaying an image including a 3D object with low delay and high quality.

Solution to Problem

In solving the above problem, one embodiment of the present invention relates to an image processing apparatus. This is an image processing apparatus for generating a display image of a space including an object, the image processing apparatus including an object model storage part configured to store a distribution of contribution ratios of a plurality of light sources representing the sizes of effects thereof on the color of a figure of the object in association with model data of the object, the plurality of light sources being in different directions relative to the object, a rendering part configured such that, when rendering the figure of the object in the display image, the rendering part determines a pixel value of the figure of the object by calculating a weighted sum of luminance values of light reflected from the object after emanating from intra-scene light sources established in the space, the calculation being made using as a weight the light source contribution ratios obtained with respect to the directions corresponding to the intra-scene light sources, and an output part configured to output the data of the display image that includes the figure of the object.

Another embodiment of the present invention relates to an object data generation apparatus. This is an object data generation apparatus for generating data related to an object and used to generate a display image, the object data generation apparatus including a light source contribution ratio distribution acquisition part configured to arrange a plurality of light sources in different directions relative to the object in a virtual space and to repeat a predetermined number of times a sampling process that traces a ray from a virtual camera observing the object and finds a light source at which the ray has arrived, thereby obtaining a distribution of contribution ratios of the light sources representing the sizes of effects thereof on the color of a figure of the object, and a light source contribution ratio distribution data storage part configured to store the distribution of the light source contribution ratios in association with a combination of an incident position and an incident direction of the ray on the surface of the object.

Yet another embodiment of the present invention relates to an image processing method. This is an image processing method for use with an image processing apparatus for generating a display image of a space including an object, the image processing method including, given a storage part of the image processing apparatus configured to store a distribution of contribution ratios of a plurality of light sources representing the sizes of effects thereof on the color of a figure of the object in association with model data of the object, the light sources being in different directions relative to the object, a step of reading from the storage part the distribution of the light source contribution ratios, upon rendering of the figure of the object in the display image, a step of determining a pixel value of the figure of the object by calculating a weighted sum of luminance values of light reflected from the object after emanating from intra-scene light sources established in the space, the calculation being made using as a weight the light source contribution ratios obtained with respect to the directions corresponding to the intra-scene light sources, and a step of outputting the data of the display image that includes the figure of the object.

Yet another embodiment of the present invention relates to an object data generation method. This is an object data generation method for use with an object data generation apparatus for generating data related to an object and used to generate a display image, the object data generation method including a step of arranging a plurality of light sources in different directions relative to the object in a virtual space and repeating a predetermined number of times a sampling process that traces a ray from a virtual camera observing the object and finds a light source at which the ray has arrived, thereby obtaining a distribution of contribution ratios of the light sources representing the sizes of effects thereof on the color of a figure of the object, and a step of storing the distribution of the light source contribution ratios in association with a combination of an incident position and an incident direction of the ray on the surface of the object in a storage part of the object data generation apparatus.

Yet another embodiment of the present invention relates to an object model data structure. This is a data structure of an object model used by an image processing apparatus in generating a display image including an object, the data structure associating data used by the image processing apparatus to represent a shape of the object arranged in a space of a display target, with a distribution of contribution ratios of a plurality of light sources representing the sizes of effects thereof on the color of a figure of the object, the plurality of light sources being in different directions relative to the object, the distribution of the light source contribution ratios being used by the image processing apparatus upon rendering of the figure of the object, to determine a pixel value of the figure of the object by calculating a weighted sum of luminance values of light reflected from the object after emanating from intra-scene light sources established in the space, the calculation being made using as a weight the light source contribution ratios obtained with respect to the directions corresponding to the intra-scene light sources.

Incidentally, even if other combinations of the above-outlined constituent elements or the above expressions of the present invention are converted between different forms such as a method, an apparatus, a system, a computer program, a data structure, and a recording medium, they still constitute effective embodiments of this invention.

Advantageous Effects of Invention

The present invention thus makes it possible to display an image including a 3D object with low delay and high quality.

DESCRIPTION OF EMBODIMENT

Figure 1:
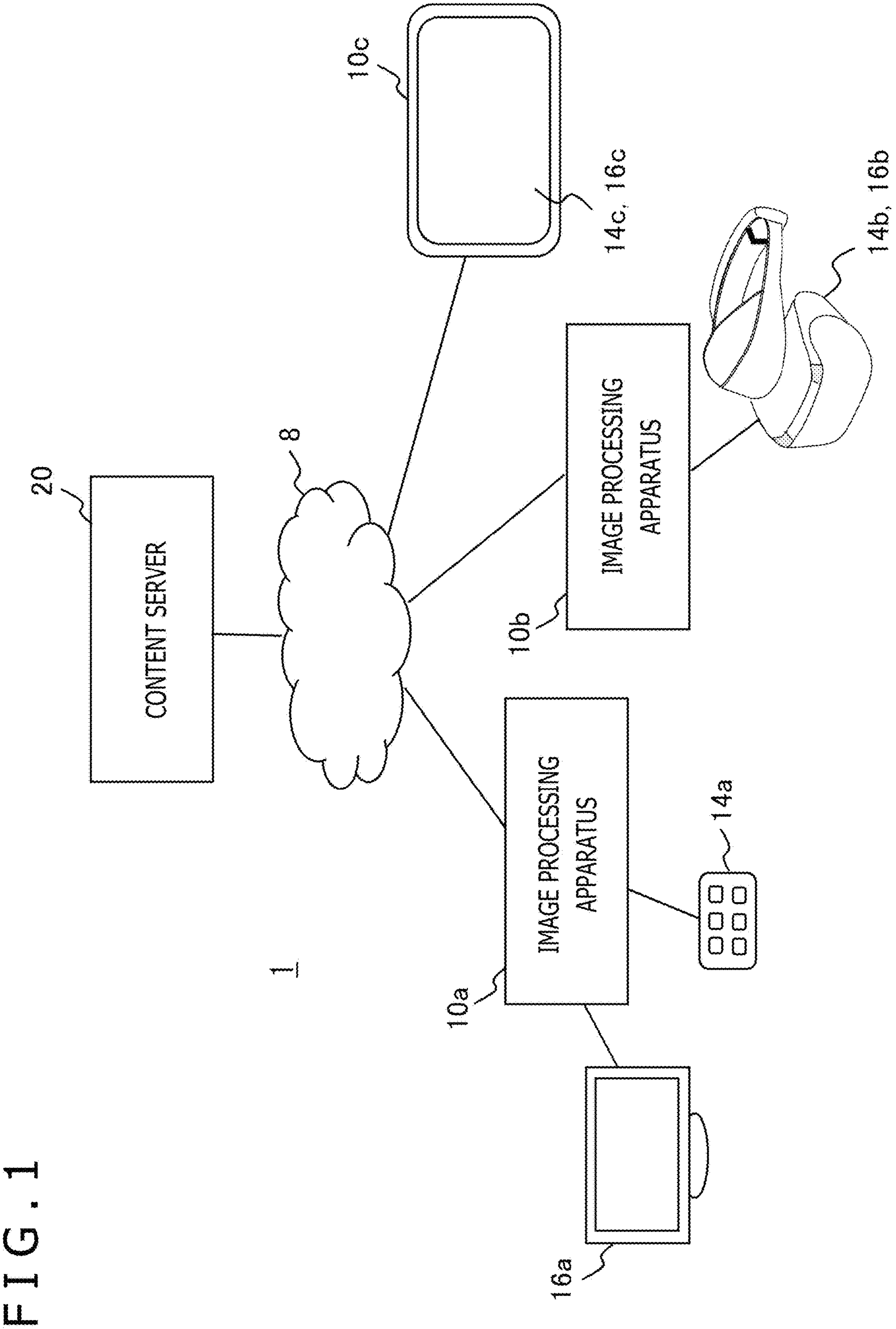
FIG. 1 is a view depicting an exemplary configuration of an image display system to which an embodiment of the present invention can be applied.

FIG. 1 depicts an exemplary configuration of an image display system to which an embodiment of the present invention can be applied. An image display system 1 includes image processing apparatuses 10*a*, 10*b*, and 10*c* displaying an image according to user operations and a content server 20 offering image data for use in display. The image processing apparatuses 10*a*, 10*b*, and 10*c* are connected respectively with input apparatuses 14*a*, 14*b*, and 14*c* for user operation and with display apparatuses 16*a*, 16*b*, and 16*c* for image display. The image processing apparatuses 10*a*, 10*b*, and 10*c* and the content server 20 may establish communication with each other via a network 8 such as a WAN (Wide Area Network) or a LAN (Local Area Network).

The image processing apparatuses 10*a*, 10*b*, and 10*c* may be connected respectively with input apparatuses 14*a*, 14*b*, and 14*c* and with display apparatuses 16*a*, 16*b*, and 16*c* in a wired or wireless manner. Preferably, two or more of these apparatuses may be formed integrally. In FIG. 1, for example, the image processing apparatus 10*b* is connected to a head-mounted display constituting the display apparatus 16*b*. The head-mounted display also functions as the input apparatus 14*b* because it is capable of changing the field of vision for display images in keeping with the movement of the user wearing it on the head.

Further, the image processing apparatus 10*c* is a mobile terminal formed integrally with the display apparatus 16*c* and the input apparatus 14*c* constituting a touch pad covering the screen of the display apparatus 16*c*. The external configuration and the connection topology of the indicated apparatuses are thus not limited to anything specific. The number of the image processing apparatuses 10*a*, 10*b*, and 10*c* connected to the network 8 and the number of the content servers 20 connected thereto are also not limited to any particular number. In the description that follows, the image processing apparatuses 10*a*, 10*b*, and 10*c* will collectively be referred to as the image processing apparatus 10; the input apparatuses 14*a*, 14*b*, and 14*c* as the input apparatus 14; and the display apparatuses 16*a*, 16*b*, and 16*c* as the display apparatus 16.

The input apparatus 14 may be any one or combination of common input apparatuses such as a controller, a keyboard, a mouse, a touch pad, and a joystick. The input apparatus 14 supplies details of user operations to the image processing apparatus 10. The display apparatus 16 may be a common display such as a liquid-crystal display, a plasma display, an organic EL (Electroluminescence) display, a wearable display, or a projector. The display apparatus 16 displays images output from the image processing apparatus 10.

The content server 20 supplies content data entailing image display to the image processing apparatus 10. The types of content are not limited to anything specific and may include electronic games, images for aesthetic purposes, webpages, and video chat with avatars. The image processing apparatus 10 may implement display processing while acquiring the content data for display from the content server 20, or may read previously acquired content data from an internal storage apparatus and use the retrieved data for display. In the latter case, the source of the content data is not limited to the content server 20; the source may be a recording medium.

In this embodiment, at least part of the display target includes a 3D object. The 3D object may be a hand-made object or a photographed (actually measured) object as long as there is available a 3D model serving as the source of rendering. For example, the image processing apparatus 10 displays a display target object as viewed from any angle according to the user's operation by means of the input apparatus 14. Preferably, the image processing apparatus 10 may control the point of view and the line of sight with respect to the object in keeping with the progress of the game. For example, as in a movie, the point of view may be defined as content data.

The 3D object may be either stationary or in motion. In any case, the image processing apparatus 10 generates at a predetermined rate a display image representing a space including the 3D object, causing the display apparatus 16 to display the image. In the field of 3D computer graphics, image representation with realistic sensations has been made possible by more accurately presenting physical phenomena that occur in the space of the display target. For example, the propagation of not only the light from the light source but also diverse forms of light arriving at a virtual point of view, such as diffuse or specular reflection from the object surface, is calculated accurately in order to represent in a more realistic manner the changes in color tone and luminance reflecting the movement of the point of view or of the object itself. A form of physics-based rendering for realizing such changes is known as ray tracing.

Figure 2:
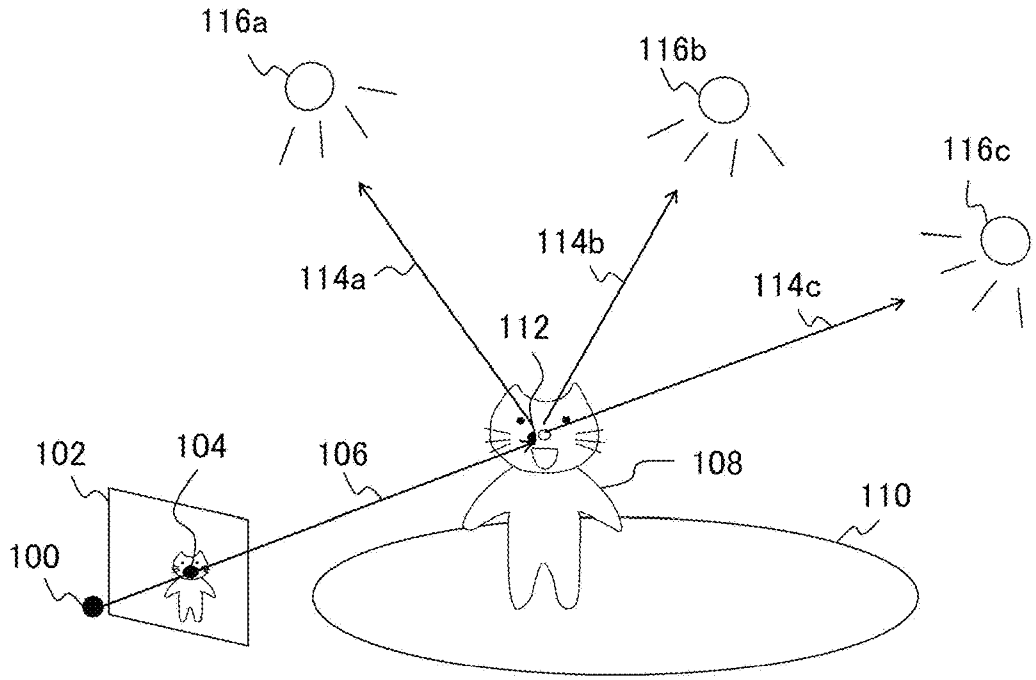
FIG. 2 is a view explaining an outline of general ray tracing.

FIG. 2 is a view explaining an outline of general ray tracing. First, it is assumed here that an object 108 and light sources 116*a*, 116*b*, and 116*c* are arranged in a virtual space 110 for the display target. When a point of view 100 from which to view the virtual space is determined, a view screen 102 is established in a position and a posture corresponding to the position of the point of view and the direction of the line of sight. The figure of the object 108 in the display image is formed by the light 114*a*-114*d* that is output from the light sources 116*a*, 116*b*, and 116*c* and that arrives at the view screen 102 following the reflection from and the transmission through the object 108.

Ray tracing is a method by which the path of the light of interest is traced backwards in order to obtain an apparent color on the surface of the object 108 and convert what is obtained into a pixel value. For example, a virtual ray (light beam) 106 coming from the point of view 100 and passing through a pixel 104 on the view screen 102 arrives at a point 112 on the surface of the object 108. Generally, the luminance (radiance) of the light reflected from a point "r" on the surface of an object in a direction "ω," expressed as L(r, ω), is expressed by the following rendering equation.

[Math. 1]

$$L(r, \omega) = L_e(r, \omega) + \int_{S_i} f_r(r, \omega, \omega_i) L_i(r, \omega_i) \cos\Theta d\omega_i \quad \text{(Eq. 1)}$$

In the above equation, $L_e$ (r, ω) stands for the luminance of the light emanating from the object itself at the point "r." The term $f_r$(r, ω, $\omega_i$) denotes BRDF (Bidirectional Reflection Distribution Function) representing the reflectivity of light at the point "r," indicative of the ratio of reflected light in the direction "ω" with respect to the luminance $L_i$(r, $\omega_i$) Of incident light in an incident direction "$\omega_i$." This function is dependent on the material and surface roughness of the object. The sign "θ" stands for the angle between the direction of a normal line to the object surface on one hand and the reflection direction "ω" at the point "r" on the other hand, and Si represents the range that can be taken by the incident direction "$\omega_1$" of light at the point "r."

In the environment in FIG. 2, the rendering equation as Equation 1 represents the relation between the intensity of the light arriving at the pixel 104 having generated the ray on one hand (left side) and the intensity of incident light from the light sources 116*a*, 116*b*, and 116*c* on the point 112 (right side) on the other hand. That is, the pixel value of the pixel 104 can be determined by use of the rendering equation with the point 112 on the object 108 used as the point "r." However, because of the difficulty in analytically solving the integral of Si, the incident direction "$\omega_i$" is sampled by the Monte Carlo method to statistically estimate an integral value.

The above approach is known as path tracing (for example, see James T. Kajiya, "The rendering equation," ACM SIGGRAPH Computer Graphics, Volume 20, Issue 4, August 1986, p. 132-150). The larger the number of times of sampling, the closer the obtained value is to the true integral value, and the higher the quality of the image that can be generated with less noise. However, there are time constraints on displaying with low delay the image rendered at that point. Further, the BRDF is a function based on the assumption that the incident position of light is sufficiently close to the light output position "r." Meanwhile, given a translucent object such as the human skin, incident light first enters the inside of the object and is scattered therein before being output from another position in a phenomenon called SSS (Subsurface Scattering).

The materials in which SSS occurs are typically high-density media and thus present a complex scattering process from light incidence to output. This makes accurate estimation difficult. In view of this, there has been proposed BSSRDF (Bidirectional Scattering Surface Reflection Distribution Function) that models output light solely on light output position and direction as the parameters (for example, see Henrik Wann Jensen and three others, "A Practical Model for Subsurface Light Transport," (U.S.), Proceedings of the 28th annual conference on Computer graphics and interactive techniques, SIGGRAPH' 2001, 2001, P. 511-518).

Also proposed are methods by which subsurface scattering is spuriously traced using a random walk (for example, see "Arnold for maya user guide/subsurface," [online], 2021, Autodesk, (searched on Oct. 27, 2021), Internet <URL: https://docs.arnoldrenderer.com/display/A5AFMUG/Subsurface>, Cedar 'zedar' T., "Physical Rendering with Random Walk Sub-Surface Scattering," [online], Jan. 9, 2019, LINKEDIN®, [searched on Oct. 27, 2021], Internet <URL: https://www.linkedin.com/pulse/physical-renderingrandom-walk-sub-surface-scattering-zedar-thokme/).

In any case, the physics-based rendering reflecting such diverse phenomena is capable of implementing highly accurate reality. Meanwhile, the higher the accuracy pursued, the more complex the calculations involved, the larger the volume of resources required, and the higher the possibility of incurring delays in display with respect to changes in the point of view and in the object. In contrast, this embodiment acquires beforehand the data representing the specific degree to which the object image is affected by respective light sources in respective directions. The previous data acquisition is intended to generate high-quality images while reducing the volume of calculations involved during operation. In the description that follows, the distribution of the sizes of the effects of direction-dependent light sources on the object image will be referred to as "light source contribution ratio distribution."

Figure 3:
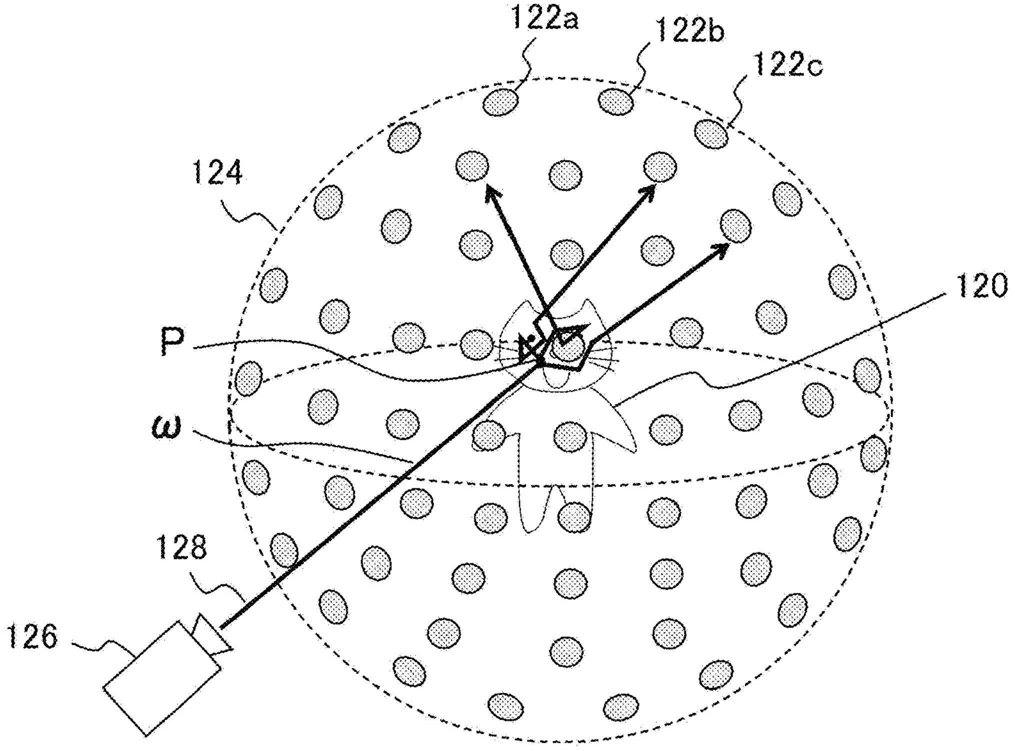
FIG. 3 is a view explaining a method of acquiring a distribution of light source contribution ratios with the embodiment.

FIG. 3 is a view explaining a method of acquiring the light source contribution ratio distribution with this embodiment. First, in a virtual space, a plurality of virtual light sources (e.g., light sources 122*a*, 122*b*, and 122*c*) are arranged in different directions relative to an object 120. In the example in FIG. 3, numerous light sources are arranged at equal distance apart on the surface of a sphere 124 having a predetermined radius centering on the center of gravity of the object 120. It is to be noted that there are no constraints on the rules of arrangement of light sources or on the number of the arranged light sources. In the ensuing description, the light sources arranged to acquire the light source contribution ratio distribution will be referred to as "contribution ratio acquiring light sources," and the light sources established in the space of the display target during operation as "intra-scene light sources."

The object 120 naturally becomes the display target through the use of the means indicated in FIG. 2 during operation. The information necessary for general computer graphics for rendering, such as shape, color, and material, is established as an object model. Given the virtual space including the object 120 and the contribution ratio acquiring light sources, a virtual camera 126 is established for observing the object 120. In this embodiment, it is to be noted that a virtual observing agent for acquiring the light source contribution ratio distribution is referred to as a "virtual camera" distinct from the "point of view" with respect to the display image during operation.

The light source contribution ratio distribution means a statistical estimate of the ratios of light output from the contribution ratio acquiring light sources in the light arriving at the virtual camera 126 past the object 120. As a calculation model, the light source contribution ratio distribution is similar to the general ray tracing explained in reference to FIG. 2. That is, upon acquisition of the light source contribution ratio distribution, a ray is generated for each of the pixels corresponding to sensors of the virtual camera 126, with the path of the ray being traced. In FIG. 3, one such ray 128 is indicated.

When the light source contribution ratio distribution is acquired in advance at a timing different from that of an operational phase where display images are actually generated, it is possible to spend more time calculating various physical phenomena such as subsurface scattering in detail. When the path of a ray is traced with high accuracy in such a manner and when the ray arrives at any one of the contribution ratio acquiring light sources, that light source is given 1 count. This sampling process is carried out a predetermined number of times to increment the count of the light source at which the ray has arrived. Eventually, the count given to each light source becomes proportional to the probability of ray arrival at the light source.

Since the object 120 and the virtual camera 126 are fixed, the point at which the ray 128 first arrives on the surface of the object 120, i.e., the incident position and incident direction, remains the same regardless of the number of times of sampling. It is assumed here that P stands for the incident position on the object 120 and "@" for the incident direction thereof. Given the figure of the object 120 viewed from the virtual camera 126, the higher the probability of the ray 128 ultimately arriving at a light source, the larger the size of the effect (contribution ratio) of that light source on the color of the position P.

If it is assumed that $n_i$ stands for the number of times the ray 128 has arrived at an i-th light source and N for the total number of times of sampling, the probability of the ray 128 arriving at the i-th light source is given as $n_i/N$. Simply, this value is considered the contribution ratio $w_i$ to the figure color. Alternatively, as will be discussed later, the contribution ratio $w_i$ may be made to reflect the reflectance ratio and attenuation rate of the ray 128 during the process of arriving at the light source past the object 120. In any case, the contribution ratio distribution W of as many as I light sources from 1 to I is expressed by a sequence $W=\{w_1, w_2, w_3, \ldots w_i, \ldots w_I\}$. This sequence represents the distribution of each ratio of contribution to the figure color at the surface position P of the object 120, the contribution ratio being obtained for each pair of the position P and the ray incident direction "@."

The sequence representing the light source contribution ratio distribution W is obtained by diversely changing the combination of the surface position P of the object 130 with the ray incident direction "ω." In the description that follows, the combination (P, @) may be referred to as "incidence parameters." For example, when the virtual camera 126 is fixed and a ray is generated for each pixel, as many incidence parameters as the number of the pixels involved can be obtained along with the distribution of the light source contribution ratios corresponding thereto. Also, when the light source contribution ratio distribution is obtained with the direction (optical axis direction) of the virtual camera 126 changed relative to the object 120, as many incidence parameters as the number of the directions multiplied by the number of pixels can be acquired, together with the distribution of the light source contribution ratios corresponding thereto.

Figures 4, 5:
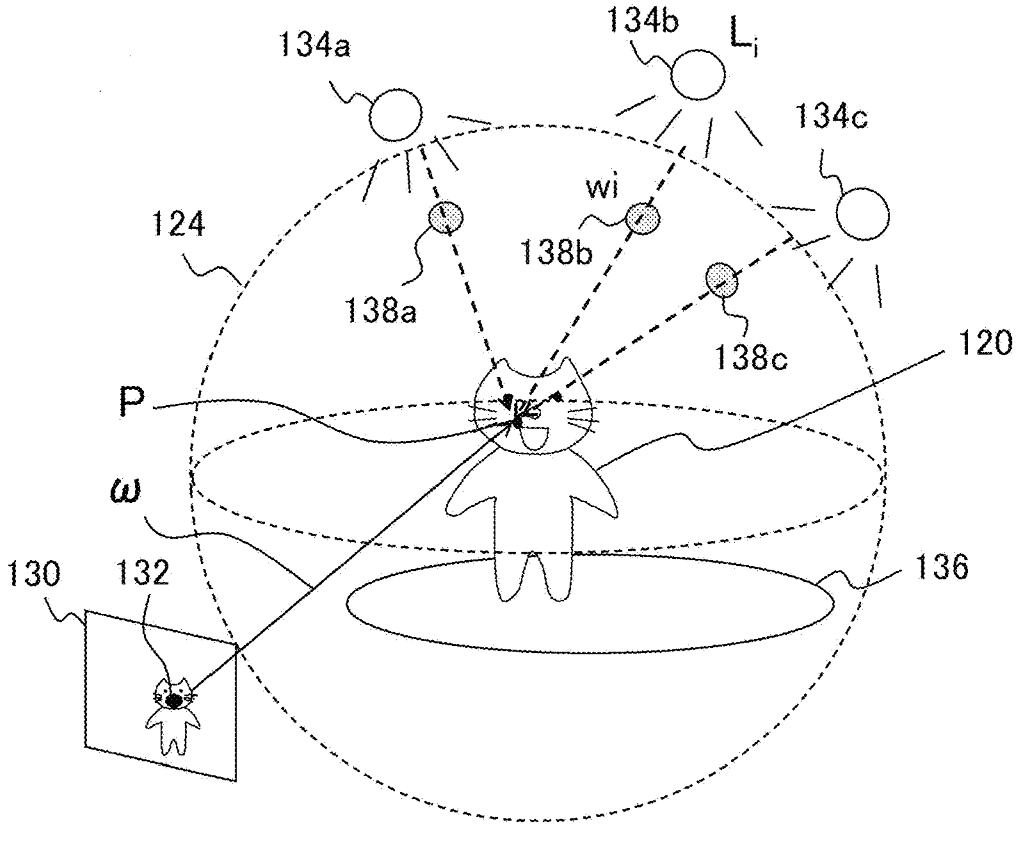
FIG. 4 is a view depicting a data structure of light source contribution ratio distributions of the embodiment.
FIG. 5 is a view explaining a method of rendering a figure of an object by use of light source contribution ratio distribution data with the embodiment.

FIG. 4 depicts a data structure of the light source contribution ratio distribution. As indicated in the view, light source contribution ratio distribution data 80 associates the incidence parameters (P, @) with the sequences representing the light source contribution ratio distribution W. As many incidence parameters (P, @) as the number of pixels multiplied by the number of the directions set for the virtual camera 126 as discussed above are obtained. Note that either the incident position P or the incident direction "w" may be duplicated.

The light source contribution ratio distribution is a sequence that is obtained for each incidence parameter and that represents the contribution ratio $\omega_i$ of each contribution ratio acquiring light source. The light source contribution ratio distribution data 80 is stored in a storage apparatus in association with model data of the object 120 or as part of such model data. The light source contribution ratio distribution data thus stored is used for rendering the object at the time of display. Note that, in the case where the object 120 is deformed, similar light source contribution ratio distribution data may be obtained in each deformed state, and appropriate data may be selected according to the shape of the object to be displayed.

FIG. 5 is a view explaining a method of rendering an object figure by use of light source contribution ratio distribution data. First, in a virtual space 136 of the display target, an object 120 and intra-scene light sources 134*a*, 134*b*, and 134*c* are arranged. A view screen 130 is established in a manner corresponding to the point of view regarding the display target. Actual incidence parameters are acquired as the position P and an incident direction "w" of a ray that is generated for each pixel and that arrives at the surface of the object 120 for the first time. In addition, in reference to the light source contribution ratio distribution data, the light source contribution ratio distribution obtained beforehand for identical or similar incidence parameters is acquired.

That light source contribution ratio distribution represents as a probability the behavioral feature of the ray after arriving at a surface position of the object 120. This translates into advance execution of part of heavily-loaded processes such as the sampling for estimating the integral value with the rendering equation as Equation 1 above and a simulation of subsurface scattering. Using the result of such prior execution thus helps lighten the processing load. Specifically, a weighted sum of the luminance values of the light from the intra-scene light sources 134*a*, 134*b*, and 134*c* is obtained using as a weight the contribution ratio $w_i$ acquired for contribution ratio acquiring light sources 138*a*, 138*b*, and 138*c* arranged in the same direction.

Here, the luminance of the light from the intra-scene light sources means the luminance of the light output from each intra-scene light source and reflected at the surface of the object 120. As indicated by the equation below, the weighted sum represents the luminance value L(P, ω) of the light output in a direction opposite to the direction "ω" at the surface position P of the object 120.

[Math. 2]

$$L(P,\omega)=\sum L_i * w_i * \rho(P) \qquad \text{(Eq. 2)}$$

In the above equation, $L_i$ denotes the luminance of the intra-scene light source in the direction of the i-th light source among the luminance acquiring light sources, and has the values of the three primary colors R (red), G (green), and B (blue). The sum symbol means the sum of all intra-scene light sources. Also, ρ(P) ($0<\rho<1.0$) stands for the reflectance ratio at the surface position P of the object 120, and determines the color of the object 120 itself with the RGB components. When the calculation of Equation 2 above is carried out for each RGB channel, the pixel value of the pixel corresponding to the ray (e.g., pixel 132) is obtained.

In this manner, accurate and simple calculations are sufficient to obtain the pixel value representing the figure at the position P corresponding to the luminance $L_i$ of the intra-scene light sources 134*a*, 134*b*, and 134*c*. For example, if the luminance $L_i$ of a given light source 134*b* is inordinately higher than that of the other light sources, then the obtained figure strongly reflects the effect of the light source 134*b* even if its contribution ratio wi is small. If the light source 134*b* is a red light source, then the luminance of the R channel is increased, which turns the image reddish. Even when the brightness and color of the intra-scene light sources 134*a*, 134*b*, and 134*c* are changed over time, such changes can be reflected instantaneously in the figure color. This embodiment thus acquires beforehand only the contribution ratio $w_i$ at fine granularity to permit easy operation regardless of the states or changes of the intra-scene light sources.

In the examples discussed above, it has been assumed that the light from all intra-scene light sources 134*a*, 134*b*, and 134*c* is reflected only once at the surface of the object 120 before arriving at the view screen 130. In this case, the luminance is reduced at the same reflectance ratio regardless of the intra-scene light sources. For this reason, as discussed above, accurate pixel values are obtained by using the contribution ratio $w_i$ including the probability $n_i/N$ of ray arrival at the contribution ratio acquiring light sources and by performing uniform multiplication with the reflectance ratio ρ(P) during operation, as indicated by Equation 2. Meanwhile, considering the case of a plurality of reflections occurring due to the presence of the object 120 itself or of some other object, the rate of reflection-induced luminance reduction varies depending on the ray path. Uniform calculations may thus lead to an increasing error.

Figure 6:
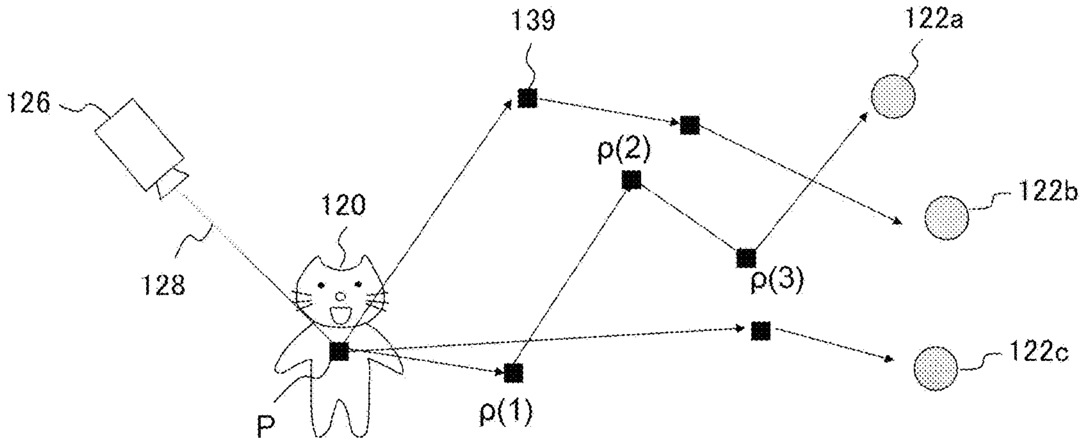
FIG. 6 is a view explaining a method of acquiring a distribution of light source contribution ratios in consideration of a plurality of reflections with the embodiment.

FIG. 6 is a view explaining a method of acquiring the light source contribution ratio distribution in consideration of a plurality of reflections. This drawing depicts the object 120, the contribution ratio acquiring light sources 122*a*, 122*b*, and 122*c*, and the virtual camera 126 at the stage of acquiring the light source contribution ratio distribution. In practice, there may be numerous contribution ratio acquiring light sources arranged around the object 120 as depicted in FIG. 3. In addition, in FIG. 6, the positions where the ray 128 coming from the virtual camera 126 is reflected are represented by black rectangles (e.g., rectangle 139). As indicated by arrows, the ray 128 from the virtual camera 126 is first reflected at the same position P of the object 120 and thereafter reflected diversely by sampling until part of the ray 128 ultimately arrives at one of the contribution ratio acquiring light sources 122*a*, 122*b*, and 122*c*.

Note that reflections may also occur at other positions of the object 120. In the case where a plurality of objects are established at the stage of acquiring the light source contribution ratio distribution, reflections may further occur on objects other than the object 120. The tracing itself of such ray paths can be implemented by a method similar to that of general ray tracing. Meanwhile, with attention directed to the contribution ratio, where numerous reflections occur stochastically along the path leading to a given light source or where there is a high possibility of reflection from a low-reflectance material, the probability of the ray arriving at the light source may be high but the ratio of contribution to the figure color may conceivably be not so high.

In view of the above, the procedure explained in reference to FIG. 3 is used to allow the count given every time the ray arrives at any one of the contribution ratio acquiring light sources, to reflect the amount of luminance reduction caused by the reflections along the path. Specifically, the product of the reflectance ratios of a plurality of reflections is calculated as a luminance retention rate. For example, in FIG. 6, the ray arriving at the contribution ratio acquiring light source 122*a* is reflected at the position P before being reflected at 3 points having reflectance ratios $\rho(1)$, $\rho(2)$, and $\rho(3)$, respectively. In this case, the contribution ratio acquiring light source 122*a* at which the ray has arrived is given a retention rate $\rho(1)*\rho(2)*\rho(3)$ instead of the 1 count mentioned above.

The sampling is similarly repeated. Ultimately, the sum of the counts given to each light source is divided by the total number of times of sampling N to obtain the contribution ratio $w_i$. If it is assumed that $A_L$ denotes the number of reflections at positions other than the position P along the path of an L-th ray among as many as $n_i$ rays arriving at the i-th light source and that $\rho_L(k)$ stands for the reflectance ratio of a k-th reflection among the reflections, then the contribution ratio $w_i$ of the i-th light source is defined as follows.

[Math. 3]

$$w_i = \left(\sum_{L=1}^{n_i}\prod_{k=1}^{A_L}\rho_L(k)\right)/N \quad \text{(Eq. 3)}$$

According to what is defined by the above equation, the higher the rate of luminance reduction due to the reflections along the path of each ray, the lower the contribution ratio $w_i$ of the i-th light source at which the ray has arrived. Also, as discussed above, the greater the number of times the ray arrives at a light source, the higher the contribution ratio $w_i$ of that light source. Since the reflectance ratio $\rho_L(k)$ has RGB values, the contribution ratio $w_i$ expressed by Equation 3 above also has the RGB channels. Note that, when the reflection at the position P is not included in the calculations of the contribution ratio $w_i$, Equation 2 above may be used to determine the pixel values at the time of display image generation without recourse to the number of reflections. When the reflectance ratio $\rho(P)$ at the position P is applied upon display image generation, detailed shaping of the object 120 including its texture can be reflected in the image with high accuracy.

In the case where the scattering of rays in the object subsurface is calculated by a random walk, for example, the degree of luminance attenuation due to scattering may be estimated and reflected in the contribution ratio. The color of the object itself is determined by the fact that the attenuation rate of light intensity caused by interaction with material particles is dependent on wavelength band. When RGB rays are individually traced and their degrees of attenuation with respect to the color and material of the object are acquired, the contribution ratio of each light source in consideration of subsurface scattering is obtained for each of the three primary colors. In this case, the rate of luminance attenuation caused by a single collision with the material particles in the object subsurface is utilized. The attenuation rate is dependent on the color and material of the object and has RGB components.

In the case where the ray 128 from the virtual camera 126 is scattered in the object subsurface, the higher the attenuation rate of light, the smaller the count given to the light source at which the ray has ultimately arrived is made. Here, the light attenuation rate is higher the greater the number of times of collision with material particles and the higher the attenuation rate resulting from one collision. In other words, the smaller the values of these factors, the higher the luminance retention rate. For example, if the luminance attenuation rate of the light of a given color resulting from one collision is $\gamma(0<\gamma<1.0)$ and if the light is output from the object surface after as many as C collisions, then the count is multiplied by the retention rate $(1-\gamma)^C$. Since this value corresponds to the reflectance ratio of a single reflection, the value may be inserted in the product of Equation 3 above in place of the reflectance ratio $\mu L(k0)$ at an iteration where internal scattering took place.

Regardless of the definition of the contribution ratio $w_i$, the contribution ratio acquiring light sources may be arranged to densely surround the object 120 as depicted in FIG. 3. This arrangement ensures that there exist the corresponding contribution ratio acquiring light sources regardless of the state of the intra-scene light sources and thereby improves the accuracy of the contribution ratio distribution to be read out. Also, the virtual camera may be established in a manner observing the object 120 in as many directions as possible for acquisition of the light source contribution ratio distribution. In this manner, the contribution ratio distribution corresponding to a given ray can be read out with high accuracy regardless of the point of view or the line of sight with respect to the display image. Conceivably, for example, as many as 331 contribution ratio acquiring light sources may be arranged panoramically over the object 120, with the virtual camera set up to observe the object center in 90 directions.

Figure 7:
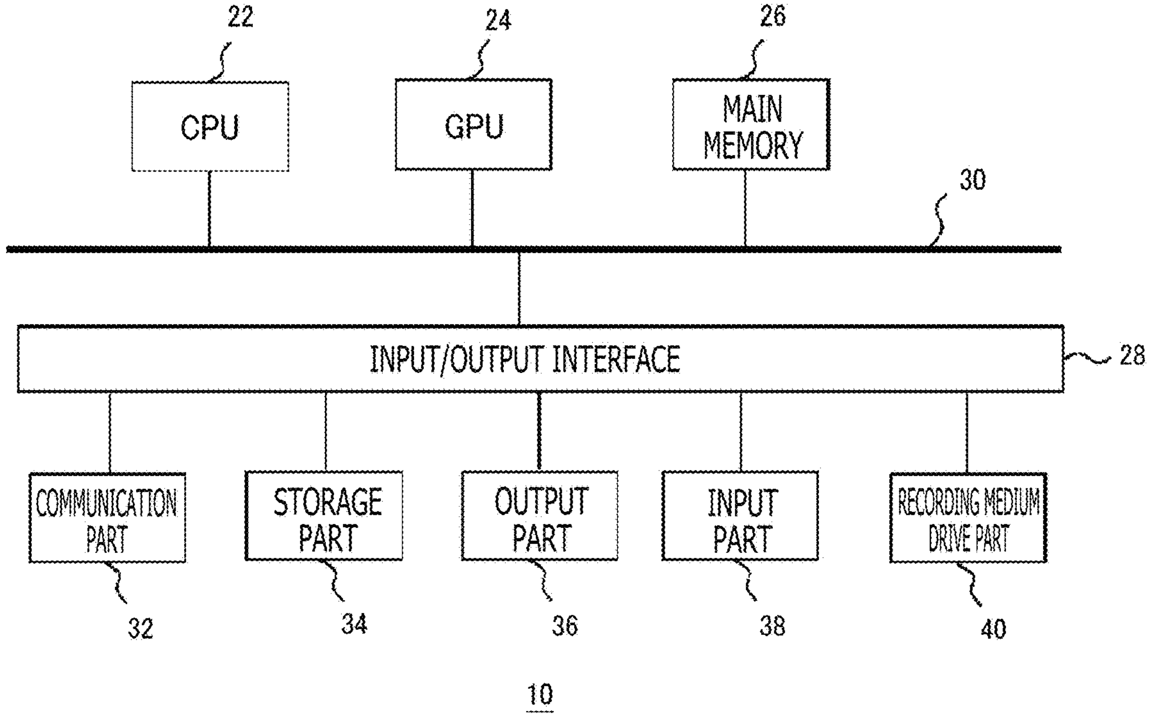
FIG. 7 is a view depicting an internal circuit configuration of an image processing apparatus of the embodiment.

FIG. 7 depicts an internal circuit configuration of the image processing apparatus 10. The image processing apparatus 10 includes a CPU (Central Processing Unit) 22, a GPU (Graphics Processing Unit) 24, and a main memory 26. These parts are connected with each other via a bus 30. The bus 30 is further connected with an input/output interface 28. The input/output interface 28 is connected with peripheral interfaces such as USB (Universal Serial Bus) and IEEE (Institute of Electrical and Electronics Engineers) 1394 interfaces, a communication part 32 including a wired or wireless LAN network interface, a storage part 34 such as a hard disk drive or a nonvolatile memory, an output part 36 that outputs data to the display apparatus 16, an input part 38 that receives input of data from the input apparatus 14, and a recording medium drive part 40 that drives removable recording media such as a magnetic disk, an optical disk, or a semiconductor memory.

The CPU 22 controls the image processing apparatus 10 as a whole by executing an operating system stored in the storage part 34. The CPU 22 further executes various programs read from the removable recording medium and loaded into the main memory 26 or downloaded via the communication part 32. The GPU 24 has the functions of both a geometry engine and a rendering processor. The GPU 24 performs rendering processing in accordance with rendering instructions from the CPU 22, and stores the resulting display image into a frame buffer, not depicted. The GPU 24 then converts the display image stored in the frame buffer to a video signal for output to the output part 36. The main memory 26 includes a RAM (Random Access Memory) that stores the programs and data necessary for processing.

Figure 8:
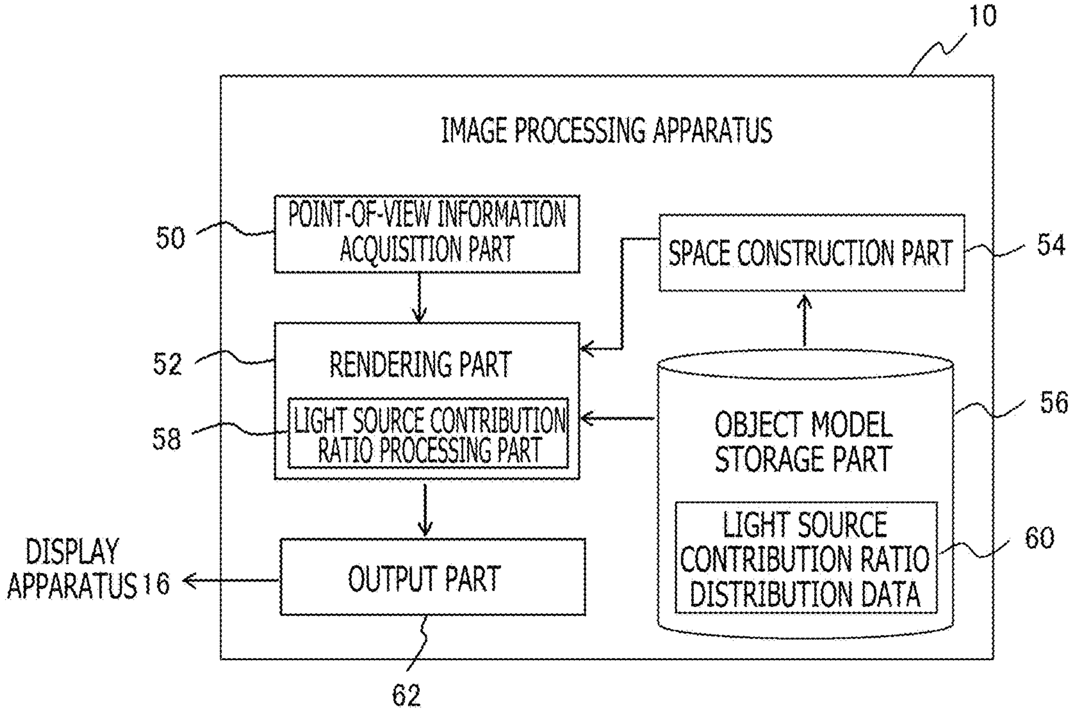
FIG. 8 is a view depicting the configuration of functional blocks in the image processing apparatus of the embodiment.

FIG. 8 depicts the configuration of functional blocks in the image processing apparatus 10 of the embodiment. The image processing apparatus 10 may perform general information processing such as advancing electronic games and communicating with the content server 20 as discussed above. In FIG. 8, attention is directed particularly to the functions for generating the display image. Alternatively, in FIG. 8, at least some of the functions indicated of the image processing apparatus 10 may be incorporated in the display apparatus 16 such as a head-mounted display. As another alternative, at least some of the functions of the image processing apparatus 10 may be incorporated in the content server 20.

Further, the functional blocks indicated in FIG. 8 as well as in FIG. 9, to be discussed later, may be implemented in a hardware configuration that includes the CPU, GPU, and various memories indicated in FIG. 7, for example. The functional blocks may also be implemented by software using the programs loaded from recording media into a memory to execute diverse functions such as the data input function, the data retention function, the image processing function, and the communication function. Thus, it will be understood by those skilled in the art that these functional blocks may be implemented by hardware alone, by software alone, or by a combination of the two in diverse forms and are not limited to any of such forms.

The image processing apparatus 10 includes a point-of-view information acquisition part 50 that acquires information regarding the point of view with respect to the display image; a space construction part 54 that constructs the space including a display target object; a rendering part 52 that renders the display image; an object model storage part 56 that stores the object model data for use in rendering; and an output part 62 that outputs the display image data to the display apparatus 16.

The point-of-view information acquisition part 50 acquires information regarding the point of view with respect to the space of the display target. For example, in the case where the display apparatus 16 is a head-mounted display, output values from an acceleration sensor inside the head-mounted display are successively obtained and used to acquire the posture of the user's head. Further, an imaging apparatus, not depicted, is further used to capture images of light-emitting markers, also not depicted, attached to the outside of the head-mounted display, in order to obtain the position of the user's head in real space.

Alternatively, an imaging apparatus, not depicted, may be provided on the side of the head-mounted display to capture images corresponding to the user's field of view, the captured images being used to acquire the position and the posture of the head through SLAM (Simultaneous Localization and Mapping), for example. Acquiring the position and the posture of the head in this manner makes it possible to approximately identify the position of the point of view and the direction of the line of sight of the user. In the case where the point of view and the line of sight are defined beforehand such as where the display apparatus 16 is a flat-screen display, the point-of-view information acquisition part 50 acquires the information from content programs, for example.

The space construction part 54 arranges objects in the display target space and causes the objects to move as needed in keeping with the user's operations and programs. For example, the space construction part 54 arranges, in a place constituting the stage for a display target game, objects corresponding to the place as the background before causing objects representing game characters to appear. At this time, the user may control the movement of the objects by means of the input apparatus 14. The space construction part 54 also arranges intra-scene light sources as per programs, for example.

The rendering part 52 sets a view screen corresponding to the point of view and the light of sight acquired by the point-of-view information acquisition part 50. The rendering part 52 generates at a predetermined rate the image representing the state of the display target space constructed by the space construction part 54. The object model storage part 56 stores the object model data used by the space construction part 54 in constructing the space or by the rendering part 52 in generating the display image. The model data may be general data that defines the shape, material, and color of the object.

In this embodiment, it is to be noted that the object model storage part 56 stores light source contribution ratio distribution data 60 regarding at least part of the display target object. As explained above, the light source contribution ratio distribution data 60 represents the distribution of the ratios of a plurality of light sources contributing to the figure color of the object, the light sources causing light to be incident on the object in different directions. The figure color of the object is dependent on the position of the object in the image and on the direction in which the object is observed. As a result, as discussed above, the light source contribution ratio distribution is acquired for each of the incidence parameters (P, ω) of the rays coming from the point of observation. Since the light source contribution ratio distribution is object-specific data, the distribution is stored in association with general object model data.

The rendering part 52 includes a light source contribution ratio processing part 58 that renders a figure by using the object with which the light source contribution ratio distribution data 60 is associated. Specifically, as explained in reference to FIG. 5, when a ray from the view screen arrives at the object of interest, the light source contribution ratio processing part 58 reads from the object model storage part 56 the light source contribution ratio distribution corresponding to the incidence parameters of the ray. The light source contribution ratio processing part 58 then determines a pixel value by calculating, on each RGB channel, a weighted sum of the luminance values of light from intra-scene light sources with use of, as a weight, the contribution ratios corresponding thereto.

Of the objects making up the display target space, those with which the light source contribution ratio distribution data 60 is not associated have their figures rendered by the rendering part 52 through ordinary ray tracing, for example. In the case where the display apparatus 16 is a head-mounted display that offers a stereoscopic view of the display image, the rendering part 52 renders an image for each of the right-eye and left-eye points of view.

The output part 62 outputs the display image data generated by the rendering part 52 to the display apparatus 16 at a predetermined rate. In the case where stereoscopic images are generated for stereovision, the output part 62 combines the right and left images into the display image for output. In the case of a head-mounted display configured to have the display image viewed through eye lenses, the output part 62 may correct the display image in consideration of distortions that may be caused by the lenses. The correction allows the display apparatus 16 to display an object-presenting video with low delay and high quality.

Figure 9:
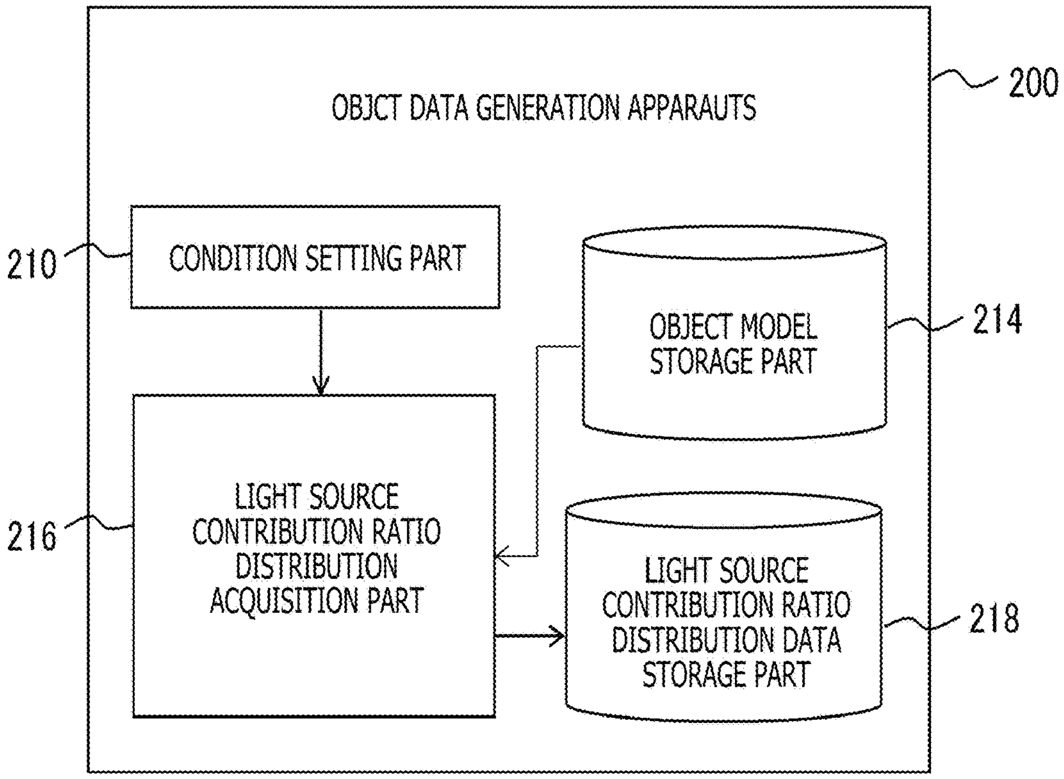
FIG. 9 is a view depicting the functional blocks of an apparatus that generates light source contribution ratio distribution data in the embodiment.

FIG. 9 depicts the functional blocks of an apparatus that generates the light source contribution ratio distribution data. An object data generation apparatus 200 may be either part of the image processing apparatus 10 in FIG. 8 or part of the content server 20 in FIG. 1, or may be set up as an independent apparatus for generating display usage data. Preferably, electronic content including the light source contribution ratio distribution data generated by the object data generation apparatus 200, the object model used in the generation, and electronic game data may be stored on recording media so as to be loaded into the main memory of the image processing apparatus 10 during operation. The internal circuit configuration of the object data generation apparatus 200 may be similar to that of the image processing apparatus 10 depicted in FIG. 7.

The object data generation apparatus 200 includes a condition setting part 210 that sets conditions under which to obtain the light source contribution ratio distribution; an object model storage part 214 that stores the model data regarding the target object of which the light source contribution ratio distribution is to be obtained; a light source contribution ratio distribution acquisition part 216 that acquires the light source contribution ratio distribution data regarding the target object; and a light source contribution ratio distribution data storage part 218 that stores the light source contribution ratio distribution data thus acquired.

The condition setting part 210 determines the number of contribution ratio acquiring light sources and their arrangement, and controls the direction of the virtual camera with respect to the object. As discussed above, the condition setting part 210 may preferably arrange a predetermined number of contribution ratio acquiring light sources in a manner evenly surrounding the object and further control the virtual camera to observe the object in even directions. However, depending on the configuration of the space making up the actual display target, the positions of the contribution ratio acquiring light sources and the directions of the virtual camera may be left uneven. For example, the distribution of the contribution ratio acquiring light sources and the directions of the virtual camera may be limited according to the distribution of intra-scene light sources and the movable ranges of the point of view and of the line of sight.

Further, depending on the size of the object and the resolution required of its figure, the number of contribution ratio acquiring light sources and the number of established virtual camera directions may be optimized. Qualitatively, the smaller the number of contribution ratio acquiring light sources and the number of virtual camera directions, the smaller the size of the light source contribution ratio distribution data can be made. The condition setting part 210 may implement these settings on its own in accordance with predetermined rules or may do so upon receipt of designation input from the content designer, for example.

According to the settings of the condition setting part 210, the light source contribution ratio distribution acquisition part 216 arranges the contribution ratio acquiring light sources around the object and sets the virtual camera. The light source contribution ratio distribution acquisition part 216 then generates a ray for each pixel and, in reference to the probability of ray arrival and the rate of luminance reduction caused by reflection and subsurface scattering along the path, obtains the contribution ratio of each light source. Common methods of ray tracing may be applied to the tracing of the generated rays. It is to be noted, as discussed above, that the quality of the display image during operation can be improved when time is spent simulating physical phenomena in consideration of the subsurface scattering, with the destinations of ray arrival sampled a large number of times.

The light source contribution ratio distribution acquisition part 216 can acquire an object-specific light source luminance distribution by causing the calculations involved to reflect the shape, color, and material of the object stored in the object model storage part 214. According to the settings of the condition setting part 210, the light source contribution ratio distribution acquisition part 216 acquires the light source contribution ratio distribution successively by diversely changing the direction of the virtual camera. As a result, the light source contribution ratio distribution W is generated for the incidence parameters (P, @) corresponding to each of all generated rays. The light source contribution ratio distribution acquisition part 216 associates the acquired light source contribution ratio distributions with the incidence parameters for storage into the light source contribution ratio distribution data storage part 218.

That is, the light source contribution ratio distribution data storage part 218 stores a plurality of data sets in which the incidence parameters (P, ω) are associated with the light source contribution ratio distribution for each object. Ultimately, such pieces of data are associated with the object model data stored in the object model storage part 214 before being stored into the object model storage part 56 of the image processing apparatus 10 illustrated in FIG. 8.

Figure 10:
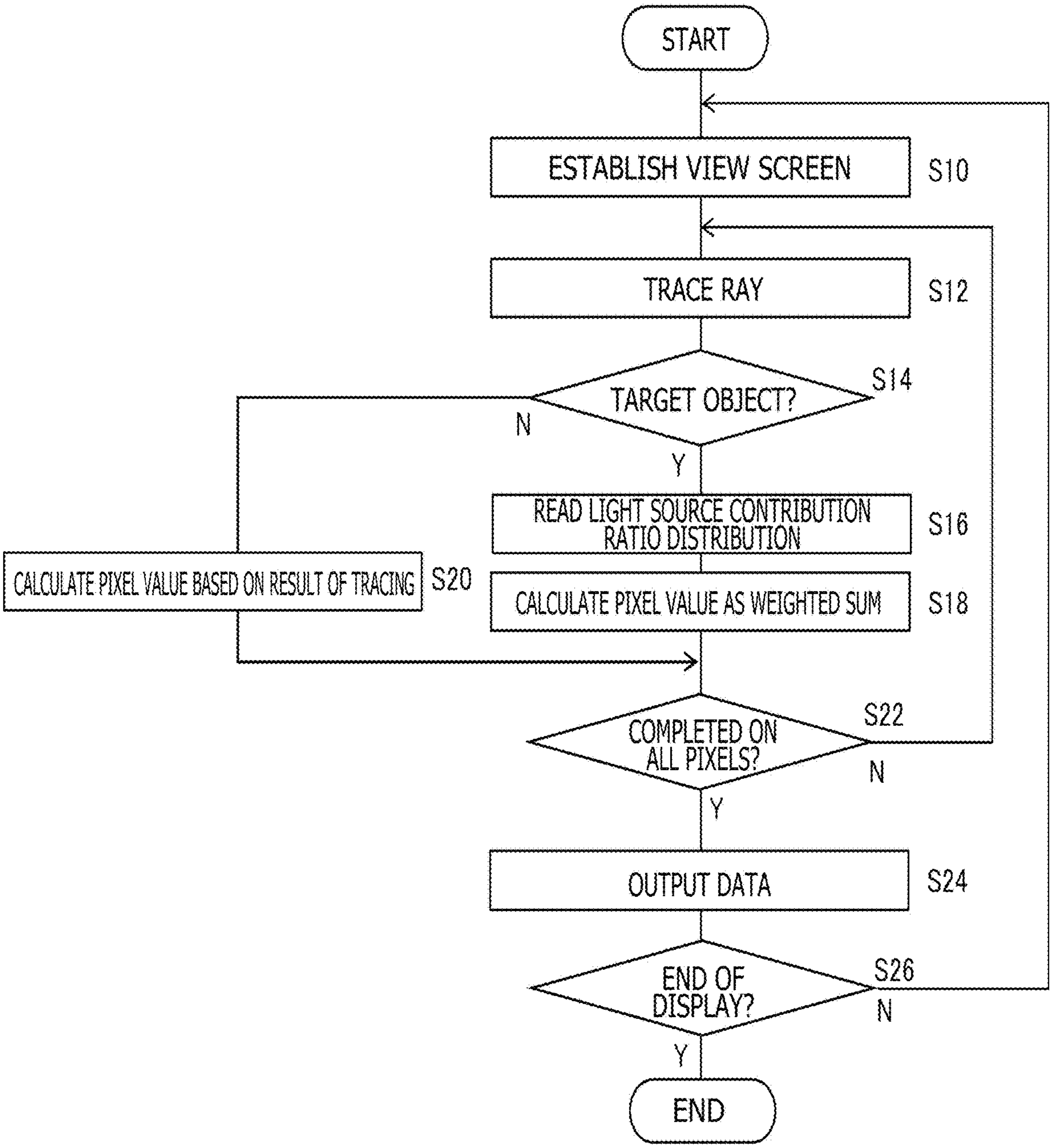
FIG. 10 is a flowchart depicting a processing procedure by which the image processing apparatus of the embodiment generates a display image.

Explained below are the operations of the apparatuses implemented using the configurations discussed above. FIG. 10 is a flowchart depicting a processing procedure by which the image processing apparatus 10 of the embodiment generates a display image. The flowchart is started in a state where an application such as a video game is initiated by the user's operation, for example. Note that, in parallel with the process in the flowchart, the image processing apparatus 10 may perform application-specific information processes to construct and change the display target space including objects, as needed. This space includes, for example, an object associated with the light source contribution ratio distribution data (target object), other objects, and intra-scene light sources.

First, the point-of-view information acquisition part 50 of the image processing apparatus 10 acquires information regarding the point of view with respect to the display space. The rendering part 52 establishes a view screen corresponding to the point of view (S10). As discussed above, the point of view may be fixed or may be changed in keeping with the movement of the head-mounted display, for example. The rendering part 52 selects one of the pixels on the view screen, generates a ray emanating from the point of view and passing through the selected pixel, and traces the generated ray (S12). In the case where the ray arrives at the object associated with the light source contribution ratio distribution data (Y in S14), the light source contribution ratio processing part 58 reads from the object model storage part 56 the light source contribution ratio distribution corresponding to the incidence parameters of the ray (S16).

The light source contribution ratio processing part 58 then determines the pixel value by calculating the weighted sum of the RGB luminance values representing the light from the intra-scene light sources, with use of, as a weight, the contribution ratios corresponding thereto (S18). In the case where the ray does not arrive at the object associated with the light source contribution ratio distribution data (N in S14), the rendering part 52 determines the pixel value by continuously tracing the ray (S20). That is, the rendering part 52 determines the pixel value through general ray tracing such as that explained in reference to FIG. 2.

The rendering part 52 repeats the process of S12 through S20 on all pixels on the view screen (N in S22). With the pixel values of all pixels determined (Y in S22), the output part 62 outputs the resulting data to the display apparatus 16 as the display image data (S24). If there is no need to end the display (N in S26), the image processing apparatus 10 performs the process of S10 through S24 in the next time step. The image processing apparatus 10 repeats the above process. If there occurs a need to end the display, the image processing apparatus 10 terminates the entire process (Y in S26).

Figure 11:
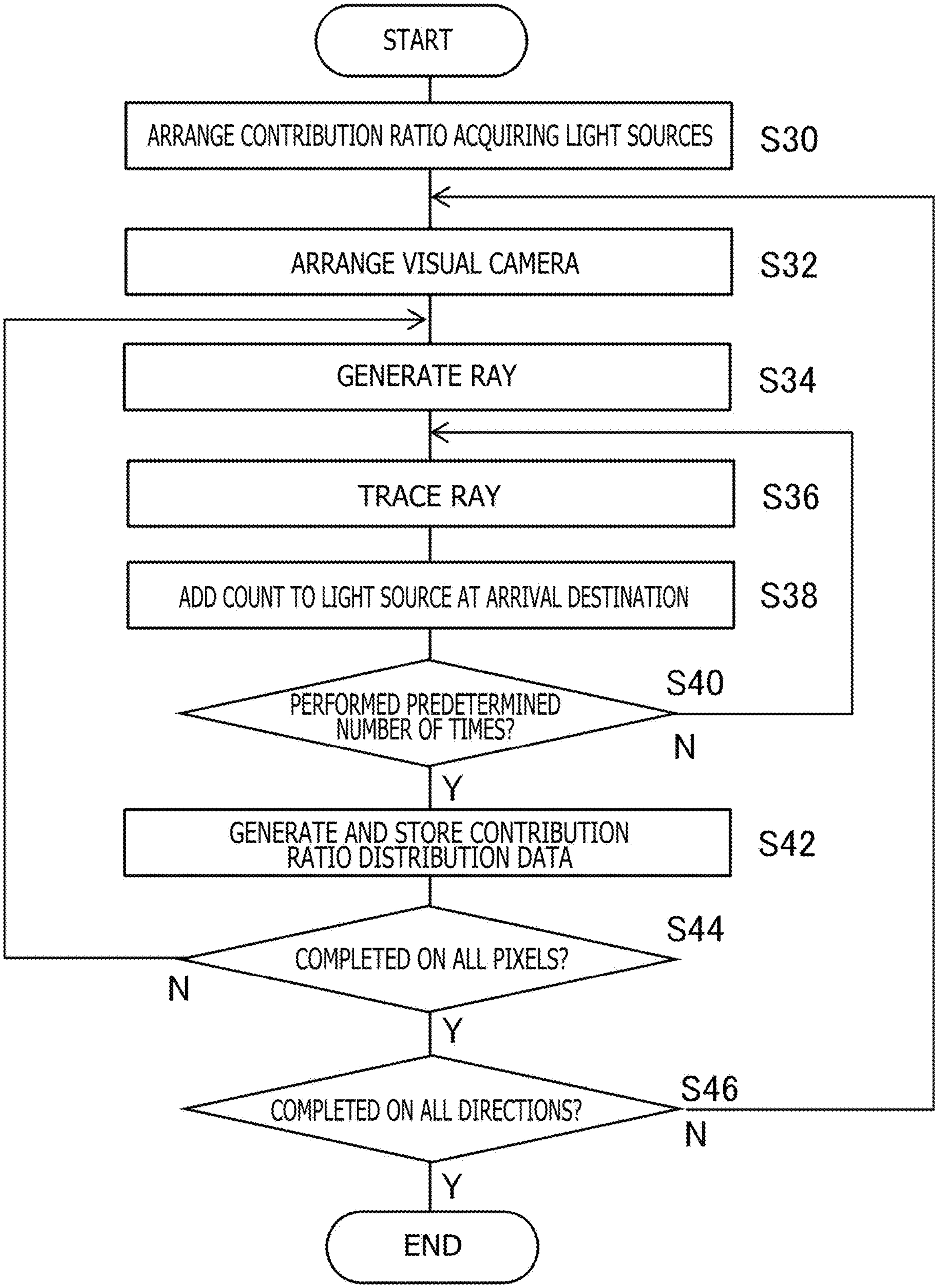
FIG. 11 is a flowchart depicting a processing procedure by which an object data generation apparatus of the embodiment generates light source contribution ratio distribution data.

FIG. 11 is a flowchart depicting a processing procedure by which the object data generation apparatus 200 of the embodiment generates the light source contribution ratio distribution data. The flowchart is started, for example, by the content designer designating the object targeted for generation of the light source contribution ratio distribution. The model data of the designated object is assumed to have been stored in the object model storage part 214.

The light source contribution ratio distribution acquisition part 216 of the object data generation apparatus 200 arranges the contribution ratio acquiring light sources around the object in a virtual space (S30), and places the virtual camera in a manner covering the object in the field of view (S32). The number of contribution ratio acquiring light sources, their arrangement, and the direction of the virtual camera are to comply with the settings of the condition setting part 210. The light source contribution ratio distribution acquisition part 216 then selects one of the pixels of the virtual camera, generates a ray emanating from an optical center and passing through the selected pixel (S34), and traces the generated ray by the method of ray tracing (S36). The light source contribution ratio distribution acquisition part 216 traces the ray in consideration of various physical phenomena regarding the object, and gives a count to the luminance acquiring light source at which the ray ultimately arrives, in accordance with predetermined rules (S38).

For one ray, the light source contribution ratio distribution acquisition part 216 performs a predetermined number of times the sampling process for obtaining the light source at which the ray has arrived (N in S40, S36, S38). When the sampling has been performed the predetermined number of times (Y in S40), the light source contribution ratio distribution acquisition part 216 calculates the contribution ratio of each light source in reference to the count given, and stores the calculated contribution ratio as the contribution ratio distribution data into the light source contribution ratio distribution data storage part 218 together with the incidence parameters of the ray (S42).

The light source contribution ratio distribution acquisition part 216 repeats the process of S34 through S42 on all pixels (N in S44). When the light source contribution ratio distributions regarding the rays passing through all pixels have been stored (Y in S44), the light source contribution ratio distribution acquisition part 216 changes the direction of the virtual camera (S32) and repeats the process of S34 through S44 (N in S46). Upon acquisition of the light source contribution ratio distributions regarding all directions to be taken by the virtual camera, the entire processing is terminated (Y in S46).

Figure 12:
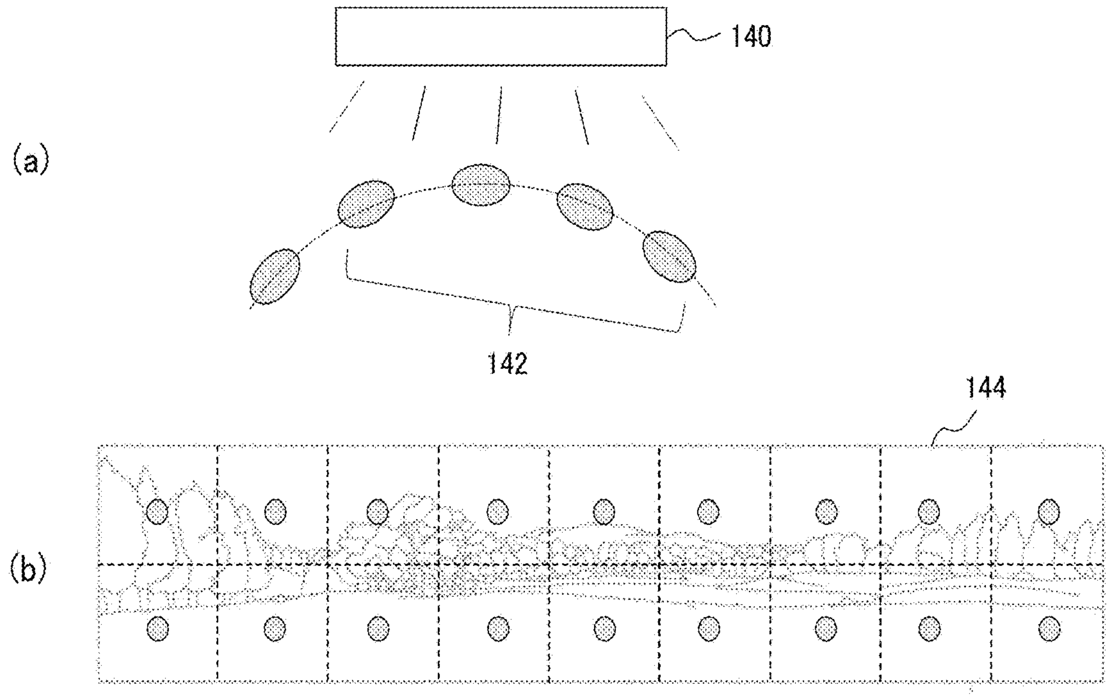
FIG. 12 is a set of views explaining an exemplary method by which the image processing apparatus of the embodiment associates distribution ratio acquiring light sources with an intra-scene light source.

Whereas FIG. 5 indicates the example in which the contribution ratio acquiring light sources and the intra-scene light sources have a one-on-one correspondence therebetween, this is not limitative of the embodiment of this invention. FIG. 12 is a set of views explaining an exemplary method by which the image processing apparatus 10 of the embodiment associates distribution ratio acquiring light sources with an intra-scene light source. Subfigure (a) depicts a case in which one intra-scene light source 140 is provided in a manner covering the directions of a plurality of contribution ratio acquiring light sources (four contribution ratio acquiring light sources 142 in the drawing). In this case, the image processing apparatus 10 associates the intra-scene light source 140 with the plurality of contribution ratio acquiring light sources 142. That is, the image processing apparatus 10 calculates the weighted sum by using the luminance value of the intra-scene light source 140 as the luminance value of each of the contribution ratio acquiring light sources 142 in pixel value calculation.

In the case where the light source is not explicitly indicated in the field of display such as in the sun, the luminance values given to the contribution ratio acquiring light sources can still be suitably set according to the direction set for an implicit light source. For example, there is a known method by which an HDRI (High Dynamic Range Image) environmental map 144 such as the one depicted in Subfigure (b) is prepared as the model data for spuriously representing the background at light load. Ray tracing using the environmental map 144 allows the background itself to serve as the light source providing a lighting environment close to natural light.

In the environmental map 144, the positions in the image represent directional information. That means the division of the image into regions provides combinations of direction and brightness. For example, dividing environmental map 144 into regions delimited by broken lines as illustrated in the figure and each of the regions being associated with the contribution ratio acquiring light source in the corresponding direction is equivalent to the intra-scene light sources and the contribution ratio acquiring light sources having a one-on-one correspondence therebetween. Thus, separately obtaining the brightness of each region and having the acquired brightness included in the data of the environmental map 144 makes it possible to determine the pixel values of the object figure by a method similar to the one in FIG. 5. It is to be noted that the rules for dividing the environmental map 144 and the number of divided regions are not limited to those illustrated. In practice, the map may be divided into many more regions.

Figure 13:
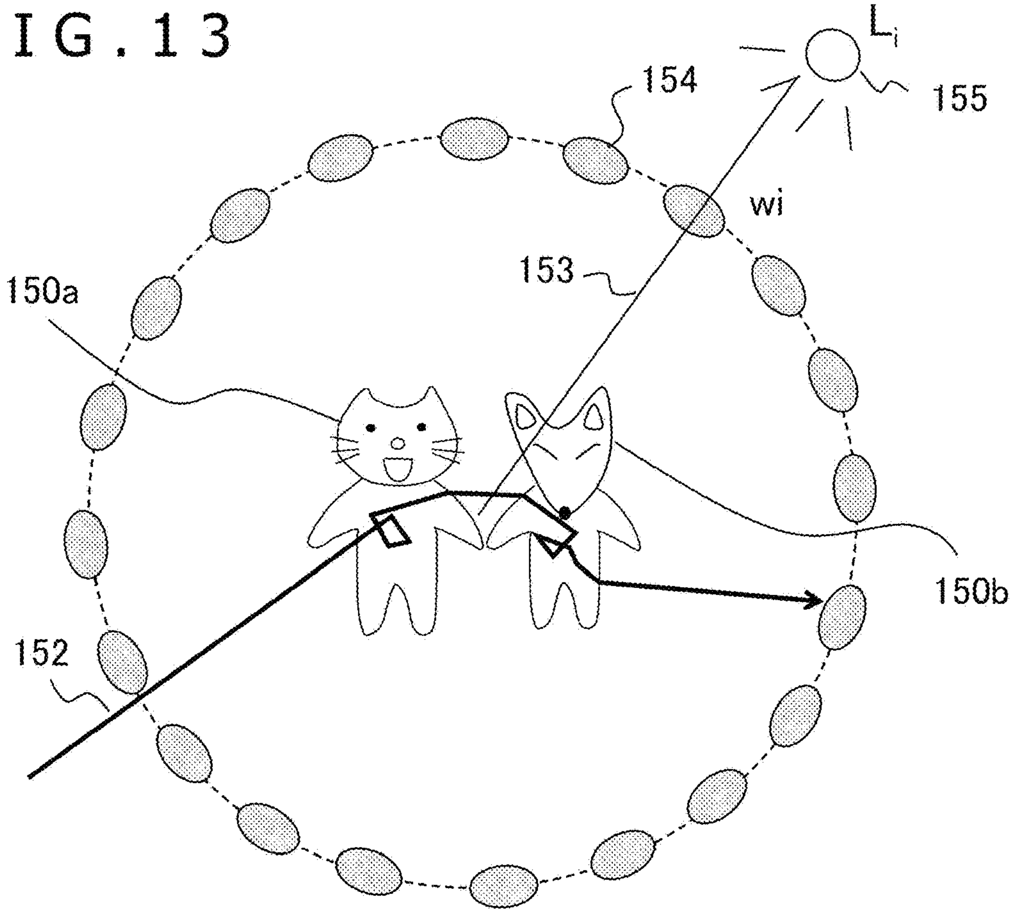
FIG. 13 is a view explaining a method of rendering figures of a plurality of objects by use of the light source contribution ratio distribution with the embodiment.

FIG. 13 is a view explaining a method of rendering figures of a plurality of objects by use of the light source contribution ratio distribution. This example assumes the case where there are two objects 150*a* and 150*b* having a constant positional relation therebetween. FIG. 13 also indicates contribution ratio acquiring light sources (e.g., contribution ratio acquiring light source 154) arranged around the objects 150*a* and 150*b*. The contribution ratio acquiring light sources may be considered to be in the directions in which the contribution ratios are obtained with respect to the objects.

That is, in the case where there exists an intra-scene light source (e.g., intra-scene light source 155) on a half-line (e.g., half-line 153) extending from the center of gravity of the objects 150*a* and 150*b* past a contribution ratio acquiring light source, the luminance $L_i$ of that intra-scene light source is added up with the contribution ratio $w_i$ obtained with respect to the corresponding contribution ratio acquiring light source as the weight. In practice, the contribution ratio acquiring light sources may be distributed spherically as illustrated in FIG. 3. The same also applies to FIGS. 14 and 15, to be discussed later.

In the case where the positional relation between the objects 150*a* and 150*b* is fixed, a ray 152 may arrive at the light source past both of the objects as illustrated. However, as long as the positional relation between the two objects remains unchanged, the probability of the ray tracing the path is also unchanged. The two objects may thus be collectively considered a single object. Consequently, the image processing apparatus 10 can determine the pixel values of the objects 150*a* and 150*b* by using the light source contribution ratio distribution data acquired beforehand in the illustrated state as in the case of one object. The same applies as long as the positional relation between three or more objects remains unchanged.

Figure 14:
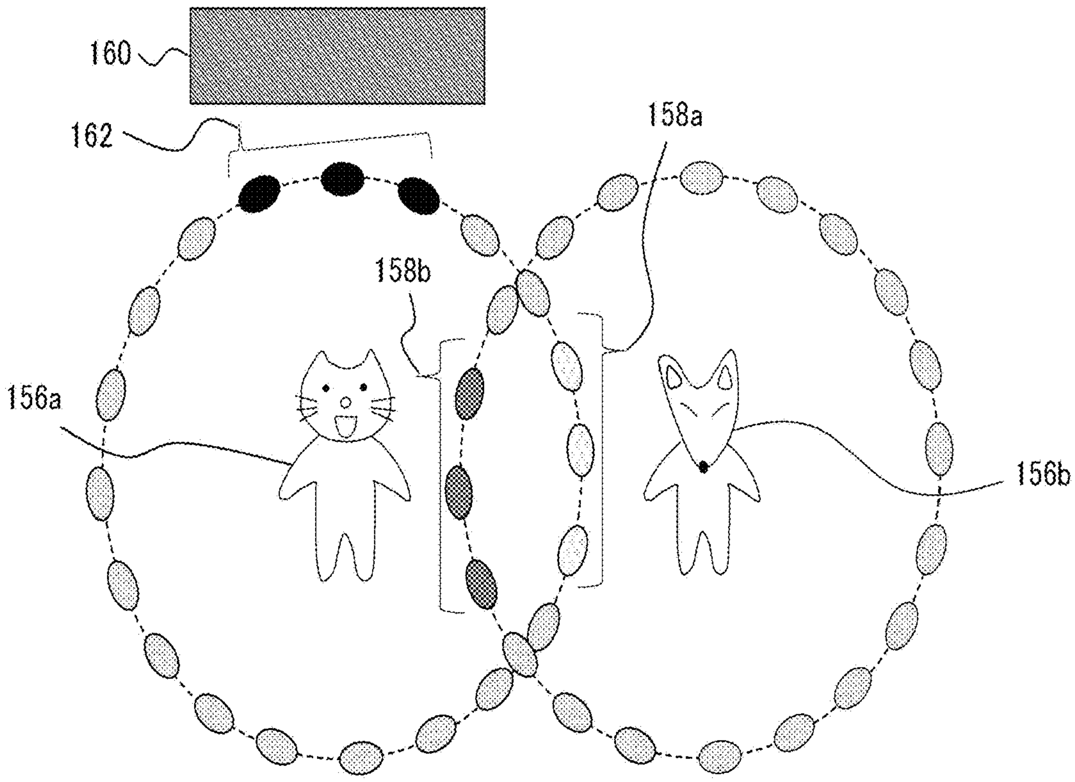
FIG. 14 is a view explaining another method of rendering figures of a plurality of objects by use of the light source contribution ratio distribution with the embodiment.

FIG. 14 is a view explaining another method of rendering figures of a plurality of objects by use of the light source contribution ratio distribution. This example assumes the case where the positional relation between two objects 156*a* and 156*b* is changed. In this case, as in FIG. 3, the light source contribution ratio distribution data is acquired individually beforehand regarding each of the objects 156*a* and 156*b*. When the objects are positioned at least a predetermined distance apart, the image processing apparatus 10 calculates the weighted sum of the luminance values of the intra-scene light sources by using as the weight the contribution ratios of the corresponding contribution ratio acquiring light sources.

When the distance between the objects 156*a* and 156*b* becomes less than a predetermined value, the image processing apparatus 10 adjusts in pixel value calculation the brightness and color of the intra-scene light sources in the direction where the other object exists. For example, of the intra-scene light sources that determine the image pixel values of the object 156*a*, those light sources of which at least either the brightness or the color may be adjusted and which are in the direction of the other object 156*b* are obtained and used for pixel value calculation. In the illustrated example, the intra-scene light sources corresponding to three contribution ratio acquiring light sources 158*a* are subject to adjustment. For example, the smaller the distance between the objects, the lower the luminance is made of the intra-scene light sources by calculation. Alternatively, the smaller the distance between the objects, the closer the color of the intra-scene light sources is made to an intrinsic model color of the other object 156*b*.

When the other object 156*b* is rendered, the brightness and color of the intra-scene light sources corresponding to the contribution ratio acquiring light sources 158*b* in the direction of the object 156*a* are adjusted likewise for pixel value calculation. Even when the other object is not the object to be rendered by the light source contribution ratio distribution, changes in the image caused by approaching of the object can similarly be controlled. For example, if an obstacle 160 approaches the object 156*a*, the brightness and color of the intra-scene light sources corresponding to the contribution ratio acquiring light sources 162 in the direction of the obstacle 160 are adjusted in calculating the figure pixel values of the object 156*a*.

Also in the above case, the luminance of the intra-scene light sources is made lower by calculation or the color of the intra-scene light sources is made closer by calculation to an intrinsic color of the obstacle 160, the nearer the obstacle 160 approaches. In any case, without changing the previously obtained contribution ratio distribution data, the image processing apparatus 10 calculates the pixel values by adjusting the brightness and color of the intra-scene light sources with use of the distribution data as the weight. This makes it possible to instantaneously represent the changes in and shades of the surface color tone caused by the approaching distance between the objects.

Figure 15:
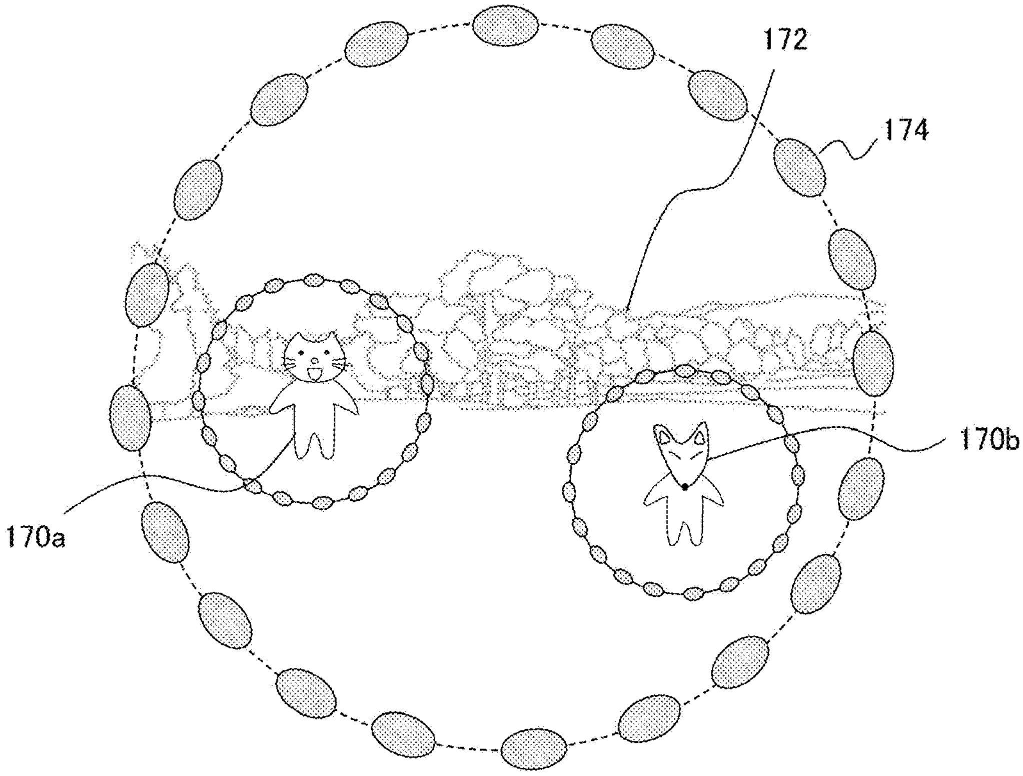
FIG. 15 is a view explaining yet another method of rendering figures of a plurality of objects by use of the light source contribution ratio distribution with the embodiment.

FIG. 15 is a view explaining yet another method of rendering figures of a plurality of objects by use of the light source contribution ratio distribution. In this example, there are two objects 170*a* and 170*b* and an object 172 serving as the place where the two objects are present in a display target space. In the illustrated example, the object 172 includes the ground and trees. In the case where these objects do not change much, it is possible to render them collectively by using the light source contribution ratio distribution as depicted in FIG. 13. Meanwhile, the objects 170*a* and 170*b* are contained in an aggregate of the contribution ratio acquiring light sources (e.g., contribution ratio acquiring light sources 174) of the place object 172.

In the case above, the light source contribution ratio distribution data is also prepared individually for each of the objects as illustrated. This allows the image processing apparatus 10 to read the light source contribution ratio distribution data associated with each of the objects and to thereby determine the pixel values of each image. When the light source contribution ratio distribution is acquired beforehand for each object without regard to the containment relation, the light source contribution ratio distributions can be prepared with a granularity fit for the characteristics of the objects such as their sizes and shapes. This makes it possible to optimize the balance between image quality, data size, and calculation load. Also, high versatility is ensured since images can be rendered by similar processes independent of the number of objects that are present in the display target space.

Figure 16:
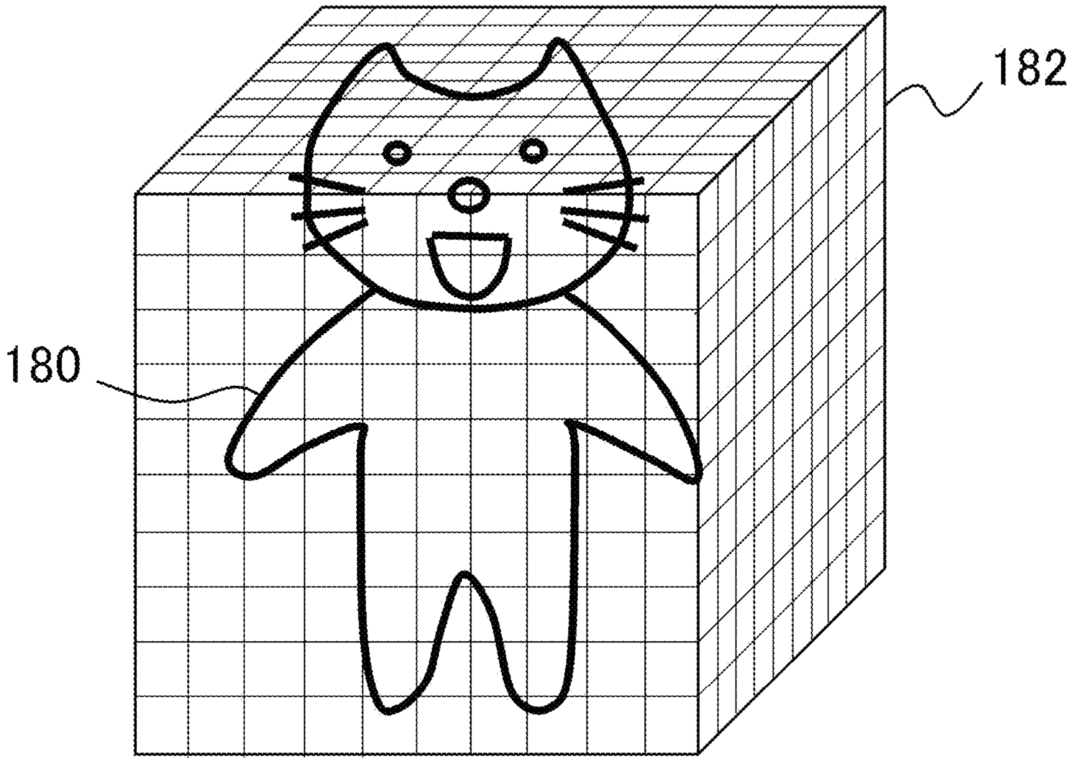
FIG. 16 is a view explaining an exemplary format in which an object model storage part of the image processing apparatus of the embodiment stores the light source contribution ratio distribution data.

Indicated next is the data format of the light source contribution ratio distribution. FIG. 16 is a view explaining an exemplary format in which the object model storage part 56 of the image processing apparatus 10 stores the light source contribution ratio distribution data 60. In this example, the light source contribution ratio distribution data is stored in a 3D space. A cuboid 182 is first prepared to contain a 3D model of a target object 180, and is divided into a predetermined number of cuboids (called voxels).

Of these voxels, those including the surface of the object 180 define the position P on which the ray among the incidence parameters is incident. That is, the granularity of the voxels corresponds to the granularity of the position P. For example, in the case where the incident position P is defined with the granularity of the object 180 being divided into 100 portions in three axial directions, the cuboid 182 is divided into 100 portions in each of the directions to form 106 voxels. One voxel stores the incident direction among the incidence parameters, i.e., the variation of the incident direction of the ray on the position of the voxel of interest, together with the individually corresponding light source contribution ratio distribution.

For example, in the case where there are 90 states of the virtual camera upon acquisition of the light source contribution ratio distribution, there are 90 directions of the ray incident on a given position P on the object surface. Meanwhile, if it is assumed that the contribution ratio $w^i$ of each contribution ratio acquiring light source has RGB channels and that there are 300 contribution ratio acquiring light sources, one voxel stores 90×300×3 contribution ratios $w_i$. In practice, in data storage regions, enumerations of incident directions and contribution ratio distributions are written to the addresses associated with the 3D coordinates of the voxels.

In this case, the object data generation apparatus 200 generates a ray incident on the position corresponding to each voxel on the surface of the object 180, and traces the generated ray. At this time, the number of rays $N_1$ (3D) traced by the object data generation apparatus 200, i.e., the volume of calculations, is given as follows. $N_1$ (3D)=number of states of virtual camera×number of incident positions on object surface×number of samples In the above equation, the number of samples is the number of times tracing is performed to find the arrival destination of one ray as a probability. Since the number of samples is counted regardless of whether or not the ray arrives at a light source, the volume of calculations is not affected by the number of contribution ratio acquiring light sources.

If it is assumed that the number of samples is 5,000 under the above conditions, $N_1$ (3D) is obtained as follows.

$$N_1(3D) = 90 \times 100^6 \times 5{,}000$$

When ray tracing is carried out a large number of times in the manner described above, the volume of calculations required during operation can be that much reduced while a balance is kept between image quality and processing speed.

When data is stored in the 3D-based storage format as illustrated, the storage regions can be defined by direct use of the 3D model data as the source of the object 180. This reduces the load of preprocessing. Meanwhile, making the granularity of incident positions finer increases sharply the amount of data. Also, of the voxels constituting the cuboid 182, those in which to store the contribution ratio distribution data are limited to the voxels that include the object surface. That means there occur numerous voxels in which no data is stored.

Figure 17:
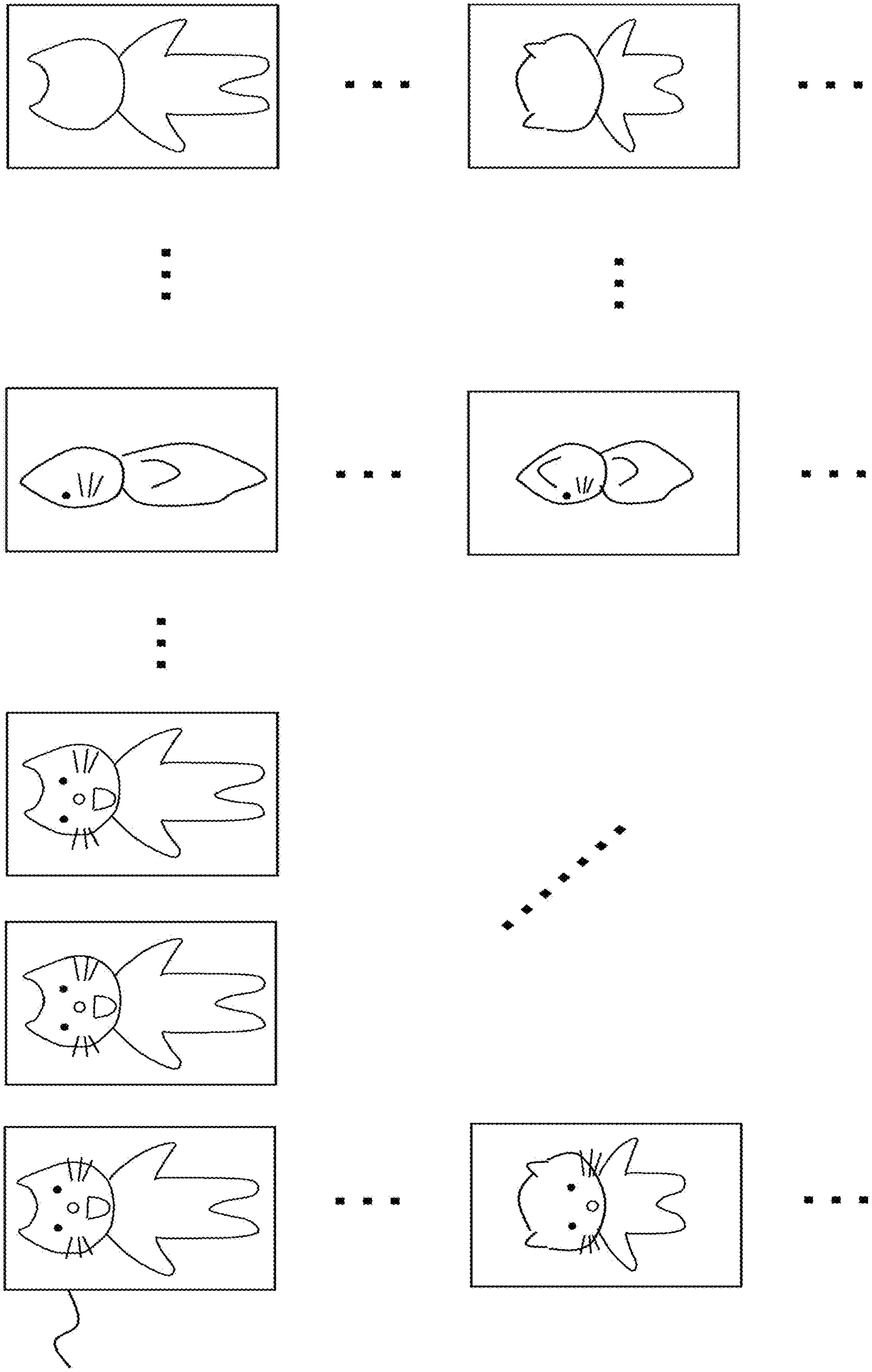
FIG. 17 is a view explaining another exemplary format in which the object model storage part of the image processing apparatus of the embodiment stores the light source contribution ratio distribution data.

FIG. 17 is a view explaining another exemplary format in which the object model storage part 56 of the image processing apparatus 10 stores the light source contribution ratio distribution data 60. In this example, the light source contribution ratio distribution data is stored as two-dimensional images. That is, the contribution ratio distributions are stored in the images of the object (e.g., image 184) as viewed from the virtual camera in various directions upon acquisition of the contribution ratios. As illustrated, the images are taken of the object by the virtual camera in different directions.

Here, the pixels of the image 184 define the incident position P of the ray among the incidence parameters. Further, since each image defines the direction of the virtual camera, the pixel position in the image determines one incident direction of the ray. That is, one pixel in the image represents one incidence parameter. Thus, one set of the corresponding light source contribution ratio distribution is stored into each pixel. For example, if it is assumed that there are 90 states of the virtual camera upon acquisition of the contribution ratio distribution and that there are 300 contribution ratio acquiring light sources, there will be generated 90 images in which 300×3 light source contribution ratios $w_i$ are stored per pixel. In practice, in the data storage regions, the contribution ratio distributions are written to the addresses associated with the 2D (Two Dimensional) coordinates of each image.

In generating the above data, the number of rays $N_1$ (2D) traced by the object data generation apparatus 200, i.e., the volume of calculations, is given as follows. $N_1$ (2D)=number of states of virtual camera×image resolution×number of samples If it is assumed that the resolution of the virtual camera is 4,096×4,096 pixels and that number of samples is 5,000 under the above conditions, $N_i$ is obtained as follows.

$$N_1(2D) = 90 \times 4{,}096^2 \times 5{,}000$$

The 2D-based data storage format such as the one illustrated in FIG. 17 also makes it possible to define the storage regions by direct use of the 3D model data of the object 180. This also reduces the load of preprocessing. Meanwhile, of the pixels constituting the image 184 and other images, those in which to store the contribution ratio distribution data are limited to the pixels representing the object image. That means there occur pixels in which no data is stored.

Figure 18:
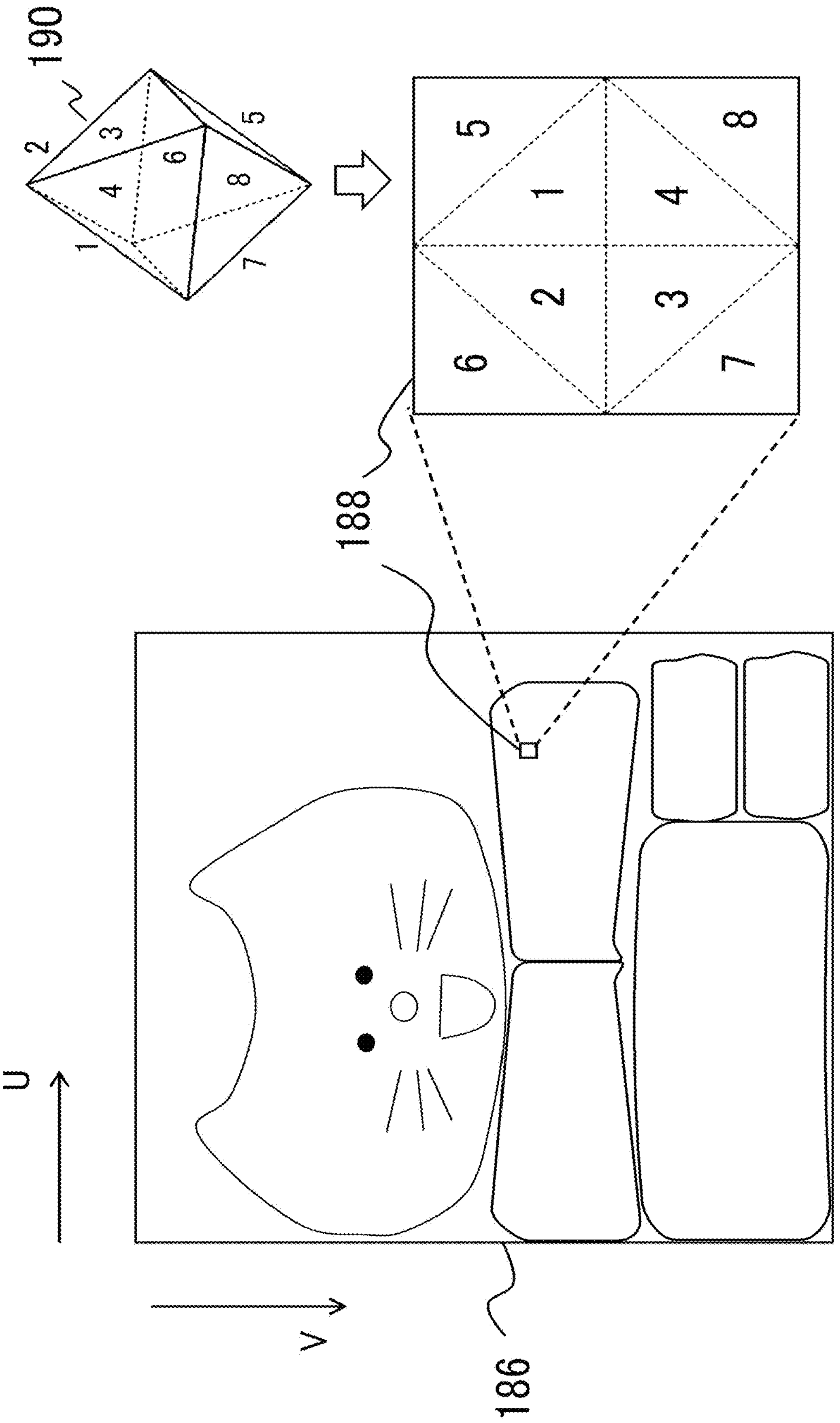
FIG. 18 is a view explaining yet another exemplary format in which the object model storage part of the image processing apparatus of the embodiment stores the light source contribution ratio distribution data.

FIG. 18 is a view explaining yet another exemplary format in which the object model storage part 56 of the image processing apparatus 10 stores the light source contribution ratio distribution data 60. In this example, the light source contribution ratio distribution data is stored as an image 186 obtained through UV unwrapping of the object. The UV-unwrapped image constitutes data that represents two-dimensionally the surface of the 3D object and is used extensively as means for texture representation. A position represented by UV coordinates in the image is associated with the coordinates of a 3D position on the object surface.

As in the case of FIG. 17, each pixel in the image 186 defines the incident position P of the ray among the incidence parameters. Meanwhile, the UV-unwrapped image 186 can represent at once the whole surface of the object without being affected by the blind angle of the virtual camera. It is thus not necessary to prepare as many images as the number of directions of the virtual camera as in the case of FIG. 17. In the case where the light source contribution ratio distributions are stored in a single image 186, variations of the incident direction of the ray among the incidence parameters, as well as the light source contribution ratio distributions corresponding to such variations, need to be stored in each pixel region.

For this reason, each pixel region may conceivably be divided into as many regions as the number of directions of the virtual camera, with each light source contribution ratio distribution stored into the divided regions. For example, as depicted enlarged on the right of the image 186 in FIG. 18, a region 188 of each pixel is first divided into 8 regions. Each of the 8 regions makes up a triangle corresponding to each side of a regular octahedron 190. In FIG. 18, the corresponding relations between the sides and the regions are indicated by numbers. In this manner, all-sky directions can be defined by the positions of the image regions 188.

For example, 8 regions are each divided further into 8 regions. When the light source contribution ratio distributions are stored into each of the divided regions, that means a set of light source contribution ratio distributions regarding 64 incident directions can be stored per pixel in the image 186. If the number of contribution ratio acquiring light sources is assumed to be 300, then 64×300×3 light source contribution ratios $w_i$ are stored per pixel. Note that, in practice, in the data storage regions, enumerations of contribution ratio distributions are written to the addresses associated with the UV coordinates of each image. The corresponding relations between the positions and the incident directions in each pixel region are to be separately set.

It is to be noted that what has been discussed above is not limitative of the rules for pixel division. Suitable pixel division rules may be set according to the number of directions of the virtual camera. Alternatively, as many UV-unwrapped images 186 as the number of directions of the virtual camera may be prepared. In this case, as in the case of FIG. 17, each image can be associated with the direction of the virtual camera. Thus, one incident direction of the ray is determined by the pixel position in the image. That is, since each pixel in the image represents one incidence parameter, one set of corresponding light source contribution ratio distributions need only be stored for each pixel. In any case, the number of rays traced by the object data generation apparatus 200 is similar to the number in the case of FIG. 17. It is to be noted that the number of pixels represents the resolution of UV coordinates. In this case, all pixels cover the whole object surface. That means there is no pixel of which no data is stored, which permits effective use of the storage regions.

As discussed above, the light source contribution ratio distributions of the embodiment are obtained for discrete incidence parameters that are dependent on the directions of the virtual camera and on the number of pixels. It follows that the incidence parameters of the ray generated from the point of view with respect to the display space during operation may or may not fully coincide with the incidence parameters upon acquisition of the light source contribution ratio distribution. As a result, the light source contribution ratio processing part 58 of the image processing apparatus 10 may estimate the light source contribution ratio distributions corresponding to the actual rays, in reference to the light source distribution ratio distributions read from the object model storage part 56.

Figure 19:
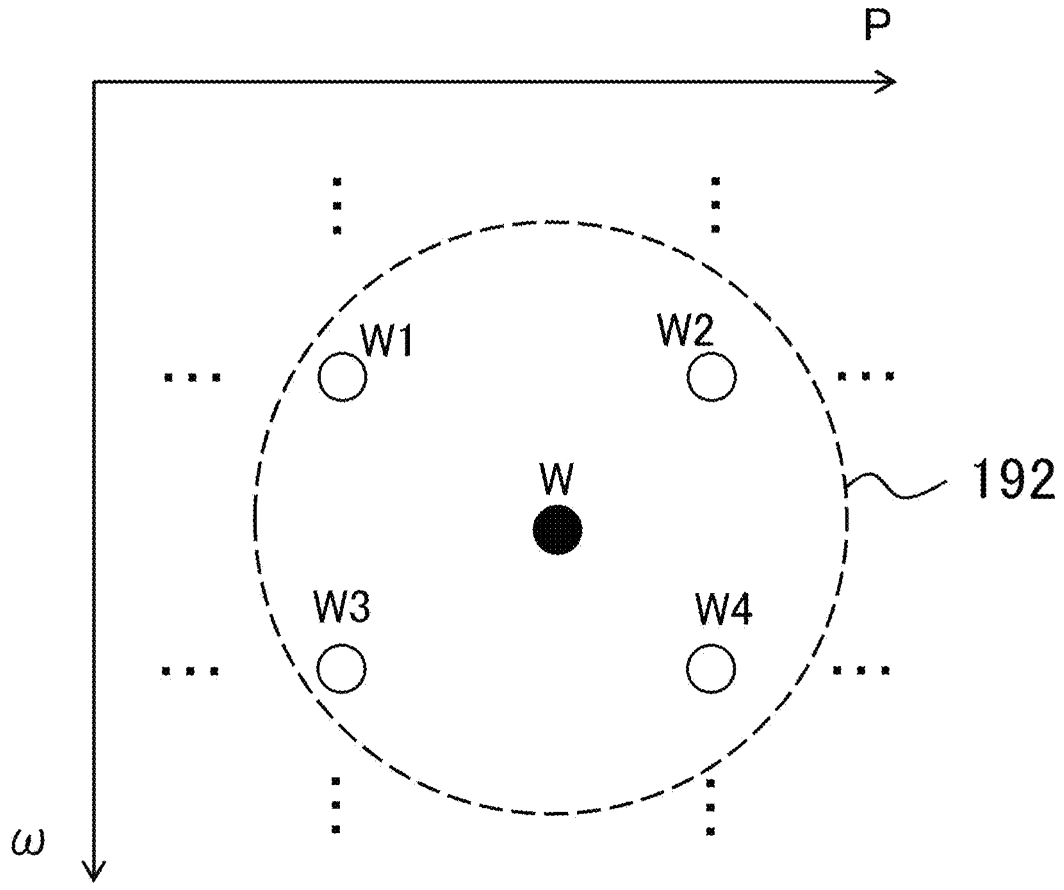
FIG. 19 is a view explaining an exemplary method by which the image processing apparatus of the embodiment estimates the light source contribution ratio distribution corresponding to a ray during operation.

FIG. 19 is a view explaining an exemplary method by which the image processing apparatus 10 estimates the light source contribution ratio distribution corresponding to a ray during operation. In the drawing, the horizontal axis denotes the incident position P of the ray among the incidence parameters, and the vertical axis denotes the incident direction w of the rays. In practice, however, the incident positions P are givens as 3D values and the incident directions w as 2D values. In the object model storage part 56 of the image processing apparatus 10, light source contribution ratio distributions W1, W2, W3, W4, . . . are stored in the formats depicted in FIGS. 16 to 18 with respect to the discrete incidence parameters indicated by hollow circles in FIG. 19.

The light source contribution ratio processing part 58 of the image processing apparatus 10 generates a ray based on the point of view with respect to the display image, and acquires the incident position and the incident angle of the ray relative to the object surface. When the ray is in the position indicated by a black circle, the light source contribution ratio processing part 58 retrieves the light source contribution ratio distributions W1, W2, W3, and W4 obtained with regard to the incidence parameters found in a range 192 at a predetermined Euclidean distance from the black-circle position, and interpolates the retrieved distributions as needed to calculate a light source contribution ratio distribution W for the actual ray. In this manner, the light source contribution ratio distribution is obtained precisely with a granularity finer than that of the pixels of the virtual camera. It is also possible to reduce the data size of the light source contribution ratio distributions to be prepared beforehand.

According to the above-described embodiment, the system for displaying images including a 3D object is arranged to acquire beforehand, as contribution ratio distributions, the sizes of the effects of a plurality of light sources in different directions relative to the object on the object figure. Further, during operation, the weighted sum of the luminance values of the intra-scene light sources is calculated using as the weight the contribution ratios obtained in the corresponding directions. The pixel values of the object figure are thus determined. This makes it possible to calculate the behavior of the light on the surface and inside of the object during ray tracing and to omit the process of performing sampling many times in search for the light source at which the ray arrives, thereby presenting high-quality images with low delay.

Further, acquiring the light source contribution ratio distributions beforehand permits accurate but time-consuming simulation of complex physical phenomena such as subsurface scattering, which makes highly realistic image representation possible. When the previously obtained information is used as the contribution ratios of the light sources in the directions relative to the object, the display image can be made to easily reflect any characteristics and colors of the intra-scene light sources and any changes that may occur during display. Further, by considering the light source contribution ratio distributions to be part of the object model, it is possible to make general use of content regardless of its types or the number of objects therein.

While the present invention has been described in conjunction with a specific embodiment given as an example, it should be understood by those skilled in the art that the above-described constituent elements and various processes may be combined in diverse ways and that such combinations, variations, and modifications also fall within the scope of this invention.

REFERENCE SIGNS LIST

- 10: Image processing apparatus
- 16: Display apparatus
- 22: CPU
- 24: GPU
- 26: Main memory
- 32: Communication part
- 34: Storage part
- 36: Output part
- 38: Input part
- 50: Point-of-view information acquisition part
- 52: Rendering part
- 54: Space construction part
- 56: Object model storage part
- 58: Light source contribution ratio processing part
- 60: Light source contribution ratio distribution data
- 62: Output part
- 200: Object data generation apparatus
- 210: Condition setting part
- 214: Object model storage part
- 216: Light source contribution ratio distribution acquisition part
- 218: Light source contribution ratio distribution data storage part

INDUSTRIAL APPLICABILITY

As described above, the present invention can be applied to diverse kinds of information processing apparatuses such as image processing apparatuses, game machines, image display apparatuses, mobile terminals, personal computers, and content servers, as well as information processing systems that include any one of such information processing apparatuses.

The invention claimed is:

1. An image processing apparatus for generating a display image of a space including an object, the image processing apparatus comprising:

an object model storage part configured to store a distribution of contribution ratios of a plurality of light sources representing sizes of effects thereof on a color of a figure of the object in association with model data of the object, the light sources being in different directions relative to the object;

a rendering part configured such that, when rendering the figure of the object in the display image, the rendering part determines a pixel value of the figure by calculating a weighted sum of luminance values of light reflected from the object after emanating from intra-scene light sources established in the space, the calculation being made using, as a weight, the distribution of contribution ratios of the plurality of light sources obtained with respect to the directions corresponding to the intra-scene light sources, wherein, given another object, the rendering part calculates the weighted sum by adjusting by calculation the luminance value of the intra-scene light source in the direction of the other object according to a distance thereto, wherein, upon approaching of the other object, the rendering part adjusts the luminance value of the intra-scene light source in the direction of the other object in such a manner that (i) the color of the intra-scene light source approaches a color on a model of the other object, (ii) the brightness of the intra-scene light source is reduced, or (iii) both; and an output part configured to output data of the display image including the object image.

2. The image processing apparatus according to claim 1, wherein the object model storage part stores a plurality of distributions of the contribution ratios in association with a combination of an incident position and an incident direction of a ray on a surface of the object, the ray emanating from a virtual camera for observing the object, and the rendering part selects the distribution of the contribution ratios to be used to determine the pixel value in reference to the combination of the incident position and the incident direction of the ray on the surface of the object, the ray coming from a point of view with respect to the display image.

3. The image processing apparatus according to claim 1, wherein the rendering part associates the distribution of brightness of the space obtained from an environmental map representing a background of the space with a luminance value of the intra-scene light source.

4. The image processing apparatus according to claim 1, wherein the object model storage part stores the contribution ratios for each of three primary colors, and the rendering part calculates the weighted sum for each of the three primary colors.

5. The image processing apparatus according to claim 1, wherein the object model storage part stores the distribution of the contribution ratios collectively representing the sizes of the effects on the color of a plurality of object figures having a constant positional relation therebetween, and the rendering part calculates the pixel values of the plurality of object figures by using the distribution of the contribution ratios collectively representing the sizes of the effects.

6. The image processing apparatus according to claim 1, wherein the rendering part individually renders the plurality of object figures arranged in the space by use of the distribution of the contribution ratios associated with each of the objects.

7. The image processing apparatus according to claim 1, wherein the rendering part renders a figure of an object with which no distribution of the contribution ratios is associated in the object model storage part, the rendering being made through ray tracing by use of the model data.

8. An object data generation apparatus for generating data related to an object and used to generate a display image, the object data generation apparatus comprising:

a light source contribution ratio distribution acquisition part configured to arrange a plurality of light sources in different directions relative to the object in a virtual space and to repeat a predetermined number of times a sampling process that traces a ray from a virtual camera observing the object and finds a light source at which the ray has arrived, thereby obtaining a distribution of contribution ratios of the light sources representing sizes of effects thereof on a color of a figure of the object, wherein the light source contribution ratio distribution acquisition part makes the contribution ratio of the light source at which the ray has arrived smaller, the larger the reduction in luminance caused by reflection of the ray on the object surface; and a light source contribution ratio distribution data storage part configured to store the distribution of the contribution ratios in association with a combination of an incident position and an incident direction of the ray on a surface of the object.

9. The object data generation apparatus according to claim 8, wherein the light source contribution ratio distribution acquisition part makes the contribution ratio of a light source higher, the greater the number of times the ray has arrived thereat during the sampling process.

10. The object data generation apparatus according to claim 8, wherein, in tracing the ray, the light source contribution ratio distribution acquisition part simulates scattering of the ray inside the object.

11. The object data generation apparatus according to claim 10, wherein the light source contribution ratio distribution acquisition part makes the contribution ratio of the light source at which the ray has arrived smaller, the larger attenuation of light caused by a collision between the ray and material particles inside the object.

12. The object data generation apparatus according to claim 8, wherein, given voxels obtained by dividing a cuboid containing the object, the light source contribution ratio distribution data storage part stores a plurality of the incident directions in association with the contribution ratios in the voxels that include the object surface.

13. The object data generation apparatus according to claim 8, wherein, given a plurality of images presenting states of the object observed by the virtual camera in different directions, the light source contribution ratio distribution data storage part stores the distributions of the corresponding contribution ratios in each of pixel regions representing the object figure.

14. The object data generation apparatus according to claim 8, wherein, in each of the pixel regions of an image obtained through UV unwrapping of the object, the light source contribution ratio distribution data storage part stores a plurality of the incident directions in association with the distributions of the contribution ratios.

15. The object data generation apparatus according to claim 14, wherein, given small regions obtained by dividing the pixel regions, the light source contribution ratio distribution data storage part associates the small regions with the incident directions and stores the distributions of the contribution ratios in each of the small regions.

16. An image processing method for use with an image processing apparatus for generating a display image of a space including an object, the image processing method comprising:

given a storage part of the image processing apparatus configured to store a distribution of contribution ratios of a plurality of light sources representing sizes of effects thereof on a color of a figure of the object in association with model data of the object from a memory, the light sources being in different directions relative to the object, reading from the storage part the distribution of the contribution ratios of the plurality of light sources;

upon rendering of the figure of the object in the display image, determining a pixel value of the figure by calculating a weighted sum of luminance values of light reflected from the object after emanating from intra-scene light sources established in the space, the calculation being made using, as a weight, the distribution of contribution ratios of the plurality of light sources obtained with respect to the directions corresponding to the intra-scene light sources, the calculating comprising:

given another object, adjusting by calculation the luminance value of the intra-scene light source in the direction of the other object according to a distance thereto; and upon approaching of the other object, adjusting the luminance value of the intra-scene light source in the direction of the other object in such a manner that (i) the color of the intra-scene light source approaches a color on a model of the other object, (ii) the brightness of the intra-scene light source is reduced, or (iii) both; and outputting data of the display image including the object figure.

17. An object data generation method for use with an object data generation apparatus for generating data related to an object and used to generate a display image, the object data generation method comprising:

arranging a plurality of light sources in different directions relative to the object in a virtual space and repeating a predetermined number of times a sampling process that traces a ray from a virtual camera observing the object and finds a light source at which the ray has arrived, thereby obtaining a distribution of contribution ratios of the light sources representing sizes of effects thereof on a color of a figure of the object, wherein the light source contribution ratio distribution acquisition part makes the contribution ratio of the light source at which the ray has arrived smaller, the larger the reduction in luminance caused by reflection of the ray on the object surface; and storing the distribution of the contribution ratios in association with a combination of an incident position and an incident direction of the ray on a surface of the object in a storage part memory of the object data generation apparatus.

18. A non-transitory computer readable medium storing a computer program for causing a computer to perform a method for generating a display image of a space including an object, the method comprising:

by a rendering part, given a storage part of the computer configured to store a distribution of contribution ratios of a plurality of light sources representing sizes of effects thereof on a color of a figure of the object in association with model data of the object from a memory, the light sources being in different directions relative to the object, reading from the storage part the distribution of the contribution ratios of the plurality of light sources;

by the rendering part, upon rendering of the figure of the object in the display image, determining a pixel value of the object image by calculating a weighted sum of luminance values of light reflected from the object after emanating from intra-scene light sources established in the space, the calculation being made using, as a weight, the distribution of contribution ratios of the plurality of light sources obtained with respect to the directions corresponding to the intra-scene light sources, the calculating comprising:

given another object, adjusting by calculation the luminance value of the intra-scene light source in the direction of the other object according to a distance thereto; and upon approaching of the other object, adjusting the luminance value of the intra-scene light source in the direction of the other object in such a manner that (i) the color of the intra-scene light source approaches a color on a model of the other object, (ii) the brightness of the intra-scene light source is reduced, or (iii) both; and by an output part, outputting data of the display image including the object image.

19. A non-transitory computer readable medium storing a computer program for causing a computer to perform a method for generating data related to an object and used to generate a display image, the method comprising:

by a light source contribution ratio distribution acquisition part, arranging a plurality of light sources in different directions relative to the object in a virtual space and repeating a predetermined number of times a sampling process that traces a ray from a virtual camera observing the object and finds a light source at which the ray has arrived, thereby obtaining a distribution of contribution ratios of the light sources representing sizes of effects thereof on a color of an image of the object, wherein the light source contribution ratio distribution acquisition part makes the contribution ratio of the light source at which the ray has arrived smaller, the larger the reduction in luminance caused by reflection of the ray on the object surface; and by a light source contribution ratio distribution data storage part, storing the distribution of the contribution ratios in association with a combination of an incident position and an incident direction of the ray on a surface of the object in a storage part of the computer.

20. A non-transitory computer readable medium storing a data structure of an object model used by an image processing apparatus in generating a display image including an object, the data structure associating with each other:

data used by the image processing apparatus to represent a shape of the object arranged in a space of a display target; and a distribution of contribution ratios of a plurality of light sources representing sizes of effects thereof on a color of an image of the object, the plurality of light sources being in different directions relative to the object, the distribution of the contribution ratios being used by the image processing apparatus upon rendering of a figure of the object to determine a pixel value of the figure of the object by calculating a weighted sum of luminance values of light reflected from the object after emanating from intra-scene light sources established in the space, the calculation being made using, as a weight, the distribution of contribution ratios of the plurality of light sources obtained with respect to the directions corresponding to the intra-scene light sources, wherein, given another object, the rendering part calculates the weighted sum by adjusting by calculation the luminance value of the intra-scene light source in the direction of the other object according to a distance thereto, wherein, upon approaching of the other object, the rendering part adjusts the luminance value of the intra-scene light source in the direction of the other object in such a manner that (i) the color of the intra-scene light source approaches a color on a model of the other object, (ii) the brightness of the intra-scene light source is reduced, or (iii) both.

* * * * *